(12) United States Patent
Kao et al.

(10) Patent No.: US 12,550,318 B2
(45) Date of Patent: Feb. 10, 2026

(54) DATA STORAGE NODE VOLTAGE MONITOR CIRCUIT AND METHODS FOR FORMING THE SAME

(71) Applicant: Taiwan Semiconductor Manufacturing Company Limited, Hsinchu (TW)

(72) Inventors: Yun-Feng Kao, New Taipei (TW); Wei Lee, Hsinchu (TW); Jyun-Yan Kuo, Hsinchu (TW); Katherine H. Chiang, New Taipei (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 502 days.

(21) Appl. No.: 18/296,389

(22) Filed: Apr. 6, 2023

(65) Prior Publication Data
US 2024/0341091 A1  Oct. 10, 2024

(51) Int. Cl.
*H10B 12/00* (2023.01)
*G11C 7/06* (2006.01)
*G11C 11/16* (2006.01)

(52) U.S. Cl.
CPC ............ *H10B 12/50* (2023.02); *G11C 7/062* (2013.01); *G11C 11/1673* (2013.01); *H10B 12/09* (2023.02); *H10B 12/315* (2023.02)

(58) Field of Classification Search
CPC ....... G11C 11/1673; G11C 7/06; G11C 7/062; H10B 12/50; H10B 12/09; H10B 12/315
See application file for complete search history.

(56) References Cited

U.S. PATENT DOCUMENTS

| 2008/0180990 | A1* | 7/2008 | Lung | G11C 13/0064 365/163 |
| 2015/0023105 | A1 | 1/2015 | Widjaja et al. | |
| 2020/0286951 | A1* | 9/2020 | Ying | H10N 50/10 |
| 2023/0410870 | A1* | 12/2023 | Roy | G11C 11/1677 |

FOREIGN PATENT DOCUMENTS

| TW | 200832402 A | 8/2008 |
| TW | 201037705 A | 10/2010 |

OTHER PUBLICATIONS

TW Patent and Trademark Office; TW Application No. 112119100 Office Action mailed Mar. 26, 2024; 14 pages.

* cited by examiner

*Primary Examiner* — John P. Dulka
(74) *Attorney, Agent, or Firm* — The Marbury Law Group, PLLC

(57) ABSTRACT

A semiconductor device includes: an array of memory cells located over a substrate, wherein each of the memory cells includes a respective instance of an access transistor and a respective instance of a memory structure configured to store a data bit and electrically connected to a source structure of the respective instance of the access transistor; and a memory monitor device including an additional instance of the access transistor, an additional instance of the memory structure that is electrically connected to a source structure of the additional instance of the access transistor, and at least one monitor transistor having a respective monitor gate electrode that is electrically connected to the source structure of the additional instance of the access transistor.

20 Claims, 20 Drawing Sheets

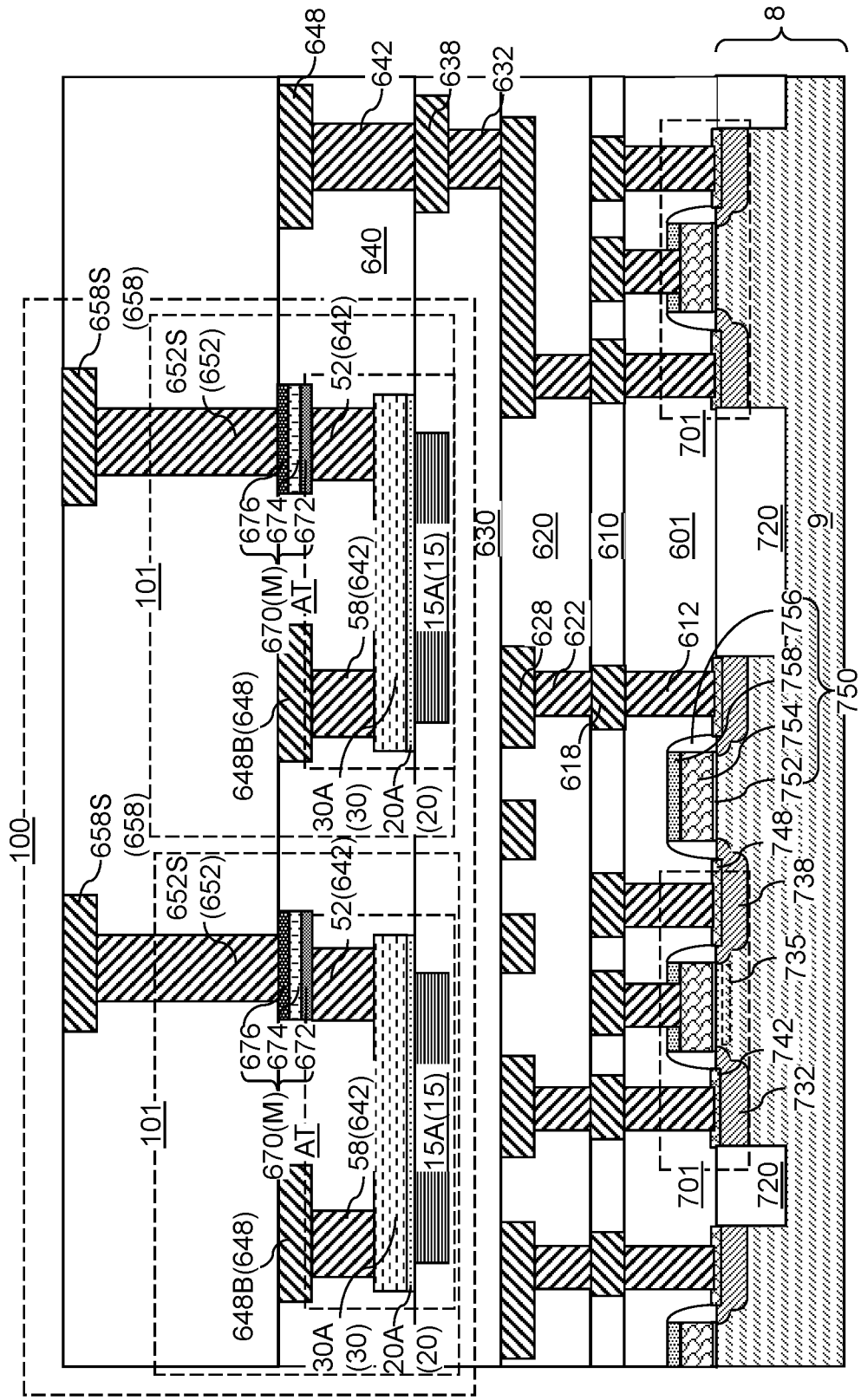

DATA STORAGE NODE VOLTAGE MONITOR CIRCUIT AND METHODS FOR FORMING THE SAME

BACKGROUND

Voltage at a data storage node may be sensed using a monitoring circuit (also referred to as a sensing circuit), which digitizes the output as either "0" or "1," and thus, does not provide any additional data than the digitized output. It may be difficult to measure voltages and/or charges on a data storage node. This may be because in memory cell, the information may be stored as a small electrical charge on a capacitor. The charge stored on these capacitors is very small, on the order of a few electrons. The capacitors are also very small, typically, on the order of a few square microns. Measuring such small charges on such small capacitors is a difficult task, as the measurement process can easily disrupt the charge state of the capacitor, leading to data loss. Additionally, the measurement equipment needs to be highly sensitive and able to distinguish the tiny charge stored on the capacitor from other sources of electrical noise.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3D is a schematic top-down view of a configuration of the second structure illustrated in FIG. 3C.

FIG. 5E is a vertical cross-sectional view of a memory array region of the fourth semiconductor structure according to an embodiment of the present disclosure.

DETAILED DESCRIPTION

Figure 1A:
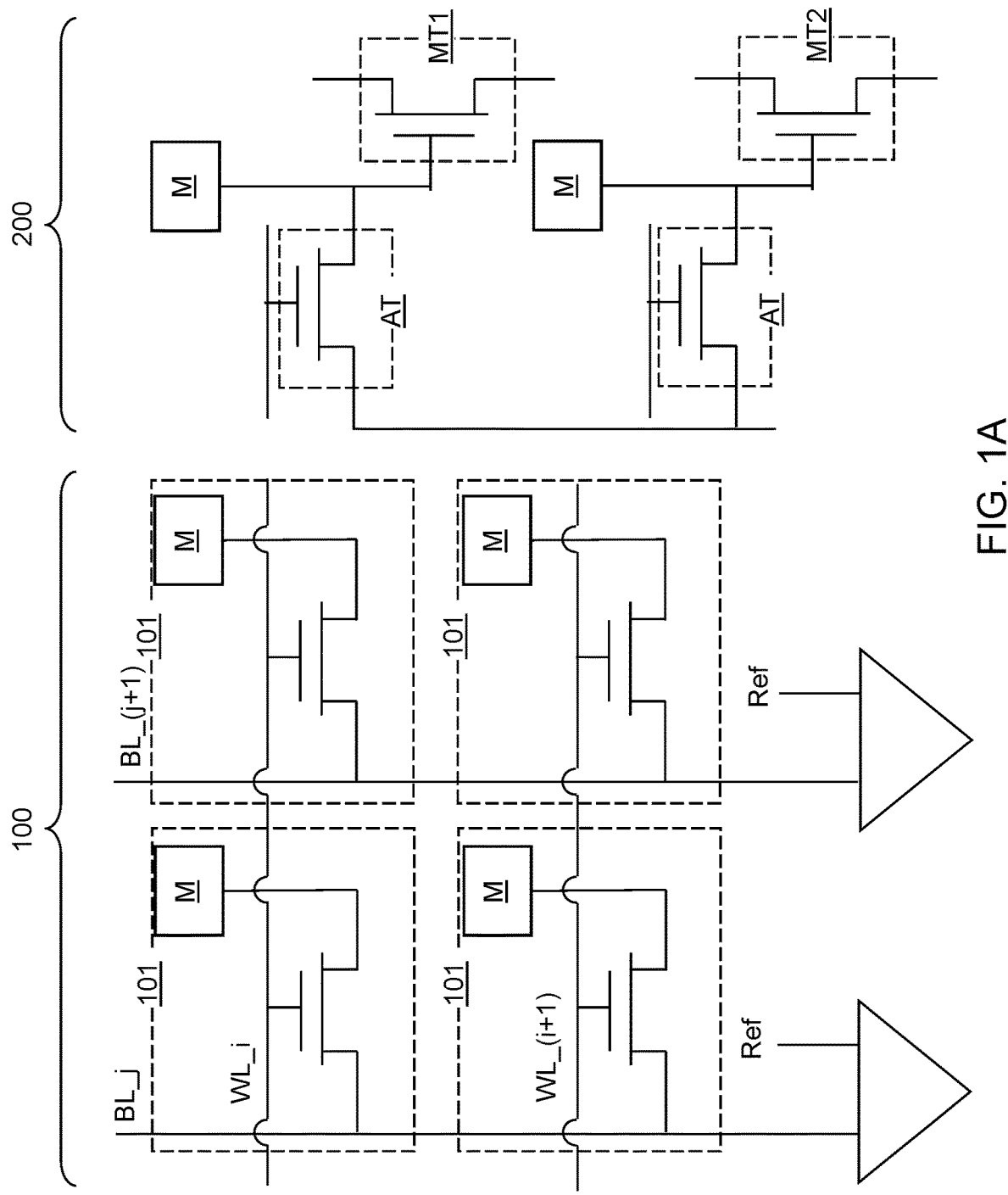
FIGS. 1A-1C are circuit schematics of various embodiments of device structures of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise.

Measuring small amounts of charge, on the order of femto-coulombs, in a DRAM storage node may be difficult. This may be because DRAM cells store information as a small electrical charge on a capacitor. The charge stored on these capacitors is very small, on the order of a few electrons. The capacitors are also very small, typically, on the order of a few square microns. Measuring such small charges on such small capacitors is a difficult task, as the measurement process can easily disrupt the charge state of the capacitor, leading to data loss. Additionally, the measurement equipment needs to be highly sensitive and able to distinguish the tiny charge stored on the capacitor from other sources of electrical noise.

This is particularly true for 1-transistor 1-cell (1T1C) DRAM cells, where the signal in the capacitor is amplified by a complex sense amplifier circuit. Similar problems arise for resistive memory cells of a small size in resistive memory cells. The fabrication of this monitoring circuit (also referred to as a sensing circuit) often utilizes significant resources and time, which may slow down the development of products utilizing this technology. Additionally, other structures of a DRAM storage node only allows for the reporting of results, rather than the entire process. This limitation makes it difficult to fully understand the behavior of the storage node. In order to gain a complete understanding of the storage node, alternative methods or technologies may need to be used.

Embodiments of the present disclosure provide a new method for in-situ monitoring of storage node potential. Transistors of only one type (one-doping type, such as n-type field effect transistors) are necessary to implement a monitor circuit of the present disclosure, thus eliminating the need to form a complementary metal-oxide-semiconductor (CMOS) circuit, i.e., transistors of an opposite type (such as p-type field effect transistors). This allows use of a reduced test pattern size compared to conventional methods. Further, this approach leads to an efficient and cost-effective solution for monitoring storage node performance. A plurality of monitor transistors having different threshold voltages may be used to quantify the amount of electrical charge in a capacitor, or the resistivity of a resistive memory cell.

Embodiments of the present disclosure provides a method for monitoring the potential of a storage node in a 1-transistor 1-storage node memory cell, and in particular, to a method for using at least one monitor transistor that detects potential changes in the storage node of the memory cell. In accordance with an embodiment of the present disclosure, the storage node (SN) of a 1-transistor 1-storage node memory cell may be connected to each gate electrode of at least one monitor transistor. The electrical potential of the storage node determines the gate voltage of the at least one monitor transistor, which in turn generates different device drain currents depending on the magnitude of the electrical potential of the storage node. The potential changes of the source node may be amplified by the at least one monitor transistor, and thus, it becomes easy to monitor the electrical potential at the storage node at various points in time or at various stages of the operation of a memory cell.

In an illustrated example, a source structure (such as an N+ diffusion region) may be laterally extended, and two electrical connections may be made to the storage node. One electrical connection may be used to electrically connect the source structure to an electrical node of a memory structure (such as a capacitor structure of a resistive memory element), and another electrical connection may be used to electrically connect the source structure to the gate electrodes of the at least one monitor transistor. This method may utilize a simplified circuit, and may still effectively monitor the electrical potential at the storage node. Various embodiments of the present disclosure are now described with reference to accompanying drawings.

Figure 1B:
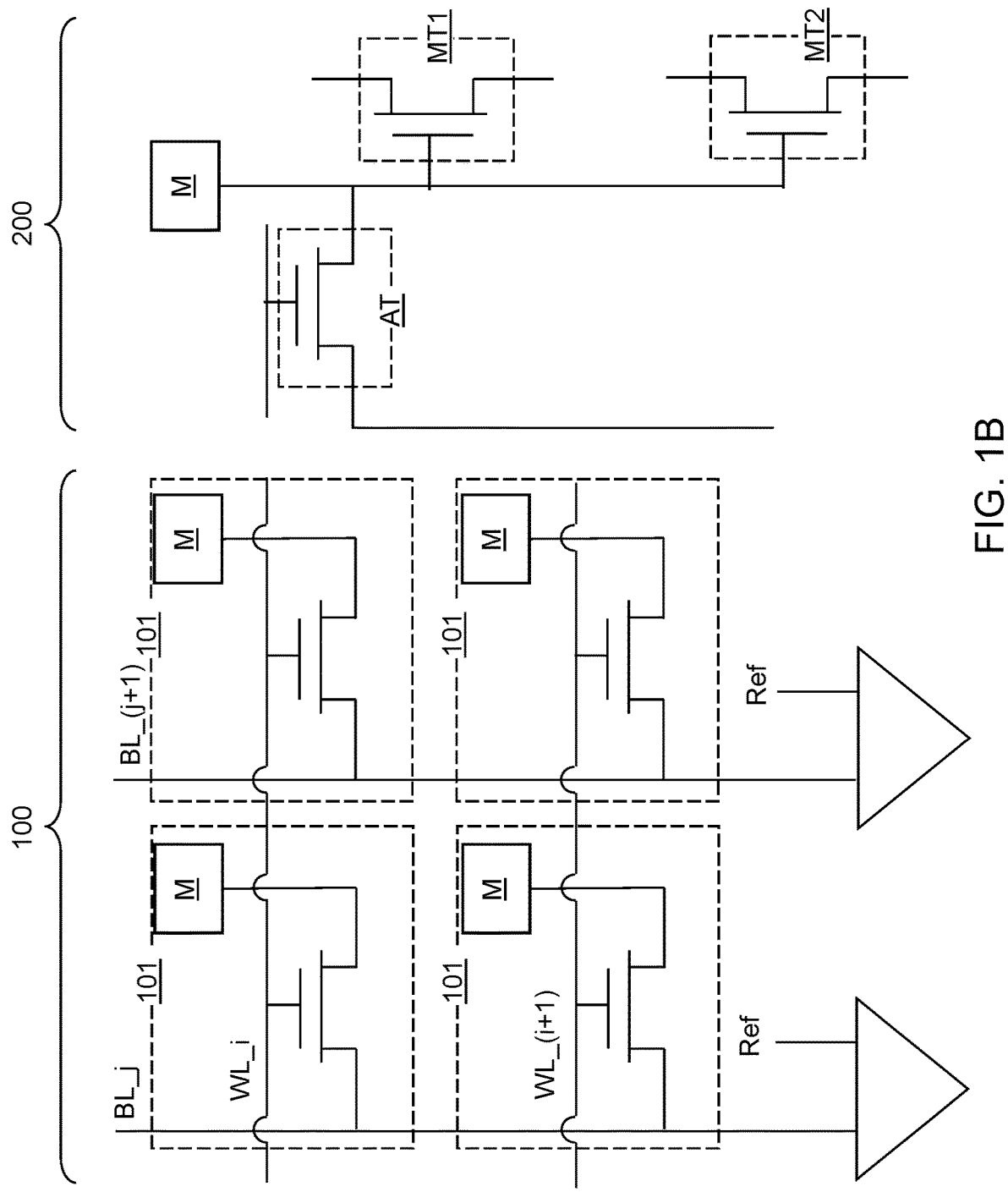
Figure 1C:
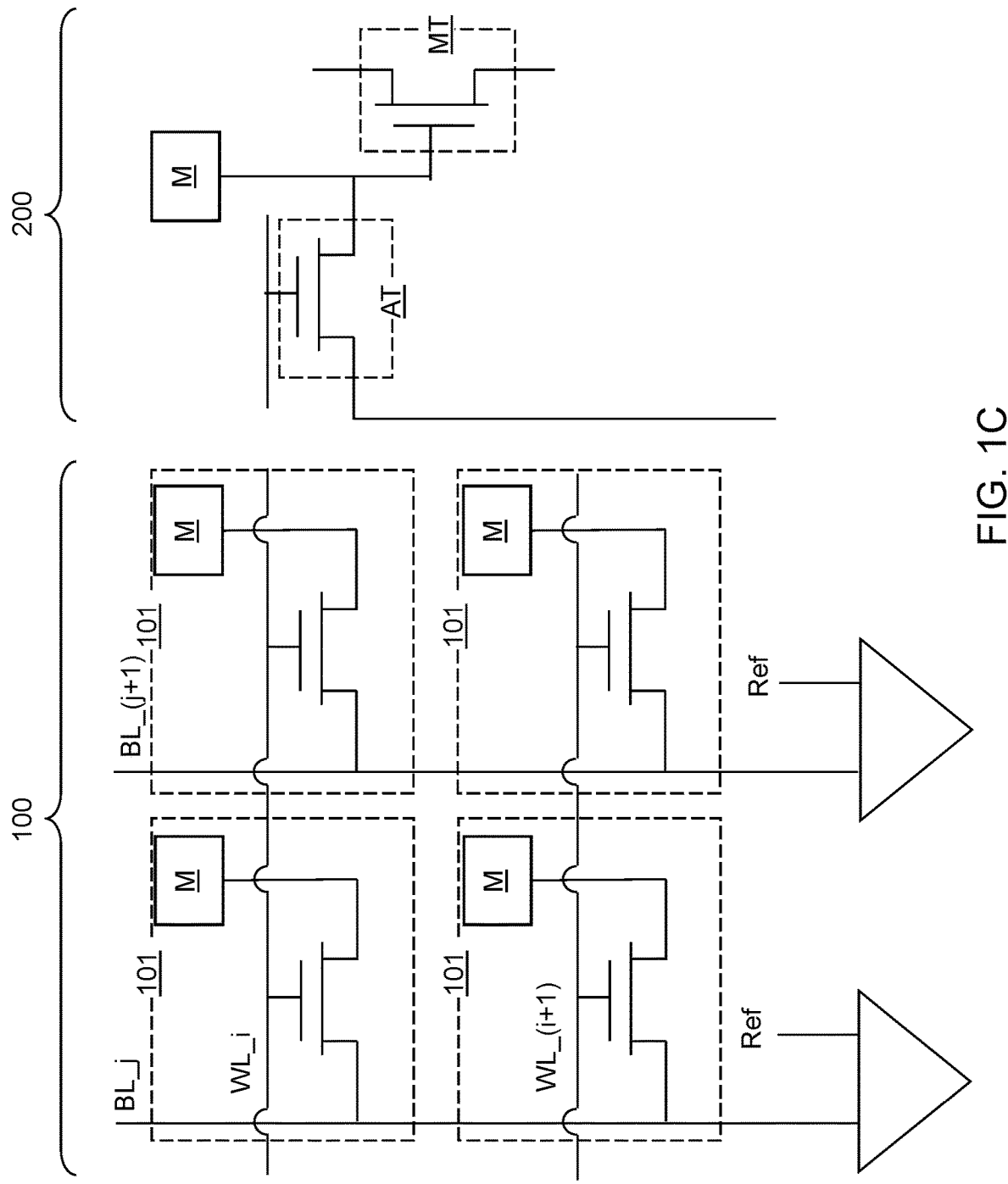

Referring to FIGS. 1A, 1B, and 1C, a first circuit schematic, a second circuit schematic, and a third circuit schematic are shown, respectively, according to embodiments of the present disclosure. Each circuit schematic represents a circuit including an array 100 of memory cells 101 and a memory monitor device 200, which may comprise a semiconductor structure formed on a same substrate. Each of the memory cells 101 comprises a respective instance of an access transistor AT and a respective instance of a memory structure M configured to store a data bit and may be electrically connected to a source structure of the respective instance of the access transistor AT. In one embodiment, the array 100 of memory cells 101 may comprise a two-dimensional array of memory cells 101 configured to be accessed using word lines and bit lines. For example, the array 100 of memory cells 101 may be addressable using M word lines and N bit lines. M and N may be independent positive integers within a range from 2 to 220. The illustrated portion of the array 100 corresponds to four memory cells that are addresses by a respective one of the i-th word line WL_i and the (i+1)-th word line WL_(i+1) and by a respective one of the j-th bit line BL_j and the (j+1)-th bit line BL_(j+1). Suitable peripheral circuitry may be provided for the word lines and the bit lines. For example, peripheral circuitries such as word line decoders, word line drivers, bit line decoders, bit line drivers, and bit line sense circuits may be provided. In one embodiment, the bit line sense circuits may comprise an operational amplifier using a respective bit line and a reference voltage line as two inputs. The memory structure M may be any memory structure known in the art that may be used to store data provided that the electric potential of a node of the memory structure M depends on, or may be made (during sensing) to depend on, the stored memory bit therein.

The memory monitor device 200 comprising at least one combination of an additional instance of the access transistor AT, an additional instance of the memory structure M that is electrically connected to a source structure of the additional instance of the access transistor AT, and at least one monitor transistor (MT1, MT2, MT) having a respective monitor gate electrode that is electrically connected to the source structure of the additional instance of the access transistor AT. In one embodiment, the memory monitor device 200 may comprise a plurality of combinations of an additional instance of the access transistor AT, an additional instance of the memory structure M that is electrically connected to a source structure of the additional instance of the access transistor AT, and at least one monitor transistor (MT1, MT2, MT).

In the first configuration illustrated in FIG. 1A, each additional instance of the memory structure M may be electrically connected to a respective monitor transistor (MT1, MT2), and a plurality of combinations of an additional instance of the access transistor AT, an additional instance of the memory structure M having a respective monitor gate electrode that is electrically connected to a source structure of the additional instance of the access transistor AT, and a monitor transistor (MT1 or MT2). Each monitor transistor (MT1, MT2) monitors the electric potential of a respective additional instance of the memory structure M. In this embodiment, each of the monitor transistors (MT1, MT2) may have different threshold voltages so that different numbers of monitor transistors (MT1, MT2) turn on depending on the voltage at the source node of a respective additional instance of the memory structure M (i.e., the node that is electrically connected to the source structure of the respective additional instance of the access transistor AT. Alternatively, the magnitude of the electrical current that flows between a source structure and drain structure of each monitor transistor (MT1, MT2) under a predetermined source-drain bias voltage condition may be measured to determine the electric potential at the source node of a respective additional instance of the memory structure M.

The second configuration illustrated in FIG. 1B may be derived from the first configuration illustrated in FIG. 1A by electrically connecting gate electrodes of a plurality of monitor transistors (MT1, MT2) to the source node of an additional instance of the memory structure M. Each monitor transistor (MT1, MT2) monitors the electric potential of a same additional instance of the memory structure M. In this embodiment, each of the monitor transistors (MT1, MT2) may have different threshold voltages so that different numbers of monitor transistors (MT1, MT2) turn on depending on the voltage at the source node of the additional instance of the memory structure M (i.e., the node that is electrically connected to the source structure of the additional instance of the access transistor AT. Alternatively, the magnitude of the electrical current that flows between a source structure and drain structure of each monitor transistor (MT1, MT2) under a predetermined source-drain bias voltage condition may be measured to determine the electric potential at the source node of the additional instance of the memory structure M.

The third configuration illustrated in FIG. 1C may be derived from the first configuration illustrated in FIG. 1A or from the second configuration illustrated in FIG. 1B by using a single additional instance of the memory structure and a single monitor transistor MT. In this embodiment, the magnitude of the electrical current that flows between a source structure and drain structure of the monitor transistor MT under a predetermined source-drain bias voltage condition may be measured to determine the electric potential at the source node of the additional instance of the memory structure M.

Generally, the memory monitor device 200 of the present disclosure may be used to characterize the electrical characteristics of a memory structure M, which include, but are not limited to, the write time of a memory cell 101. During testing of a semiconductor die including the array 100 of memory cells 101 and the memory monitor device 200, the source node and the drain node of each monitor transistor (MT1, MT2, MT) may be electrically connected to electrical nodes of an external tester, and the magnitude of the electrical current between the source node and the drain node of each monitor transistor (MT1, MT2, MT) may be tested under various test conditions. Alternatively or additionally, the source node and the drain node of each monitor transistor (MT1, MT2, MT) may be electrically connected to electrical nodes of a built-in self-test (BIST) circuit provided in the same semiconductor die or in another semiconductor die that is bonded to the semiconductor die including the array 100 of memory cells 101 and the memory monitor device 200, and various tests may be performed. In some embodiments, multiple monitor transistors (MT1, MT2) (which may include 2-16 transistors) having different threshold voltages may be connected to a source node of an access transistor AT in a memory monitor device 200, and the number of transistors that turn on may be monitors under various programming conditions for the memory structure M.

According to an embodiment of the present disclosure, the semiconductor circuit design of the present disclosure may be stored in a non-transitory machine-readable data storage medium by encoding the non-transitory machine-readable data storage medium with a set of data representing the semiconductor circuit design. As used herein, a "non-transitory" medium refers to all data storage medium other than unbounded space. As used herein, a "machine-readable" medium refers to any data storage medium that may be read by any machine, electronic or non-electronic, as known in the art. As used herein, a "data storage medium" refers to all medium that may encode data therein. As such, the non-transitory machine-readable data storage media that may be encoded with the set of data representing the semiconductor circuit design of the present disclosure include all portable or non-portable, electronic, magnetic, optical, resistive, or other data storage medium known in the art.

Figure 2A:
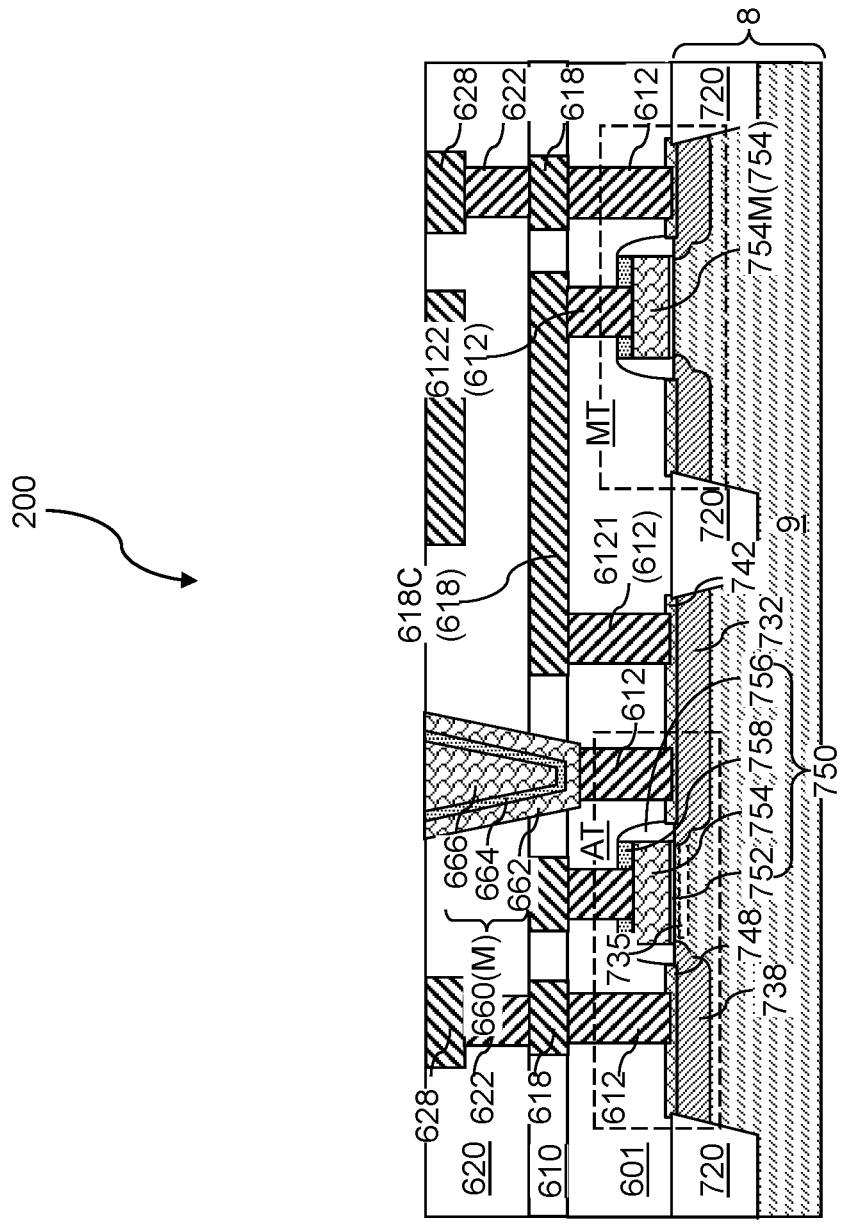
FIG. 2A is a vertical cross-sectional view of a memory monitor device region of a first semiconductor structure according to an embodiment of the present disclosure.
Figure 2B:
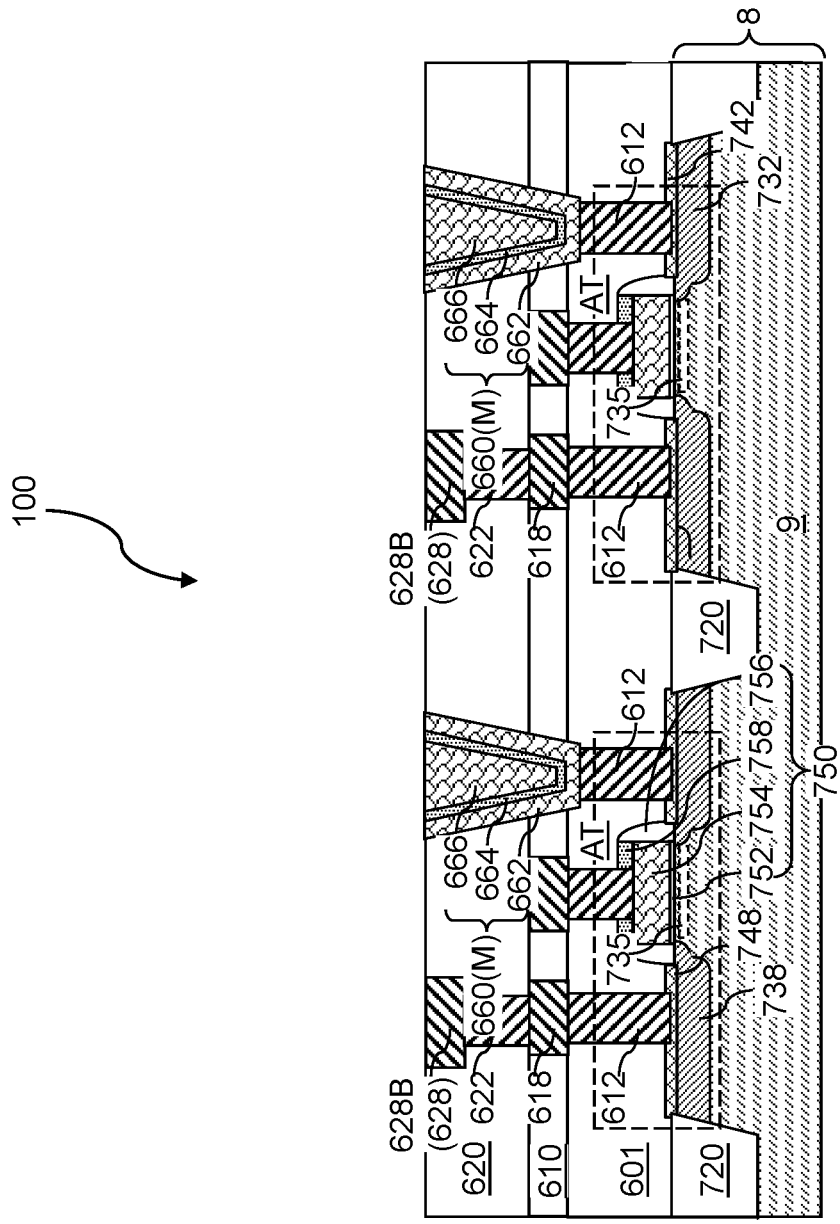
FIG. 2B is a vertical cross-sectional view of a memory array region of the first semiconductor structure according to an embodiment of the present disclosure.

Referring to FIGS. 2A and 2B, a first semiconductor structure according to an embodiment of the present disclosure is illustrated. The first structure includes a substrate 8, which may be a semiconductor substrate such as a commercially available silicon substrate. The substrate 8 may include a semiconductor material layer 9 at an upper portion thereof. The semiconductor material layer 9 may be a surface portion of a bulk semiconductor substrate, or may be a top semiconductor layer of a semiconductor-on-insulator (SOI) substrate. In one embodiment, the semiconductor material layer 9 includes a single crystalline semiconductor material such as single crystalline silicon. In one embodiment, the substrate 8 may include a single crystalline silicon substrate including a single crystalline silicon material.

Shallow trench isolation structures 720 including a dielectric material such as silicon oxide may be formed in an upper portion of the semiconductor material layer 9. Suitable doped semiconductor wells, such as p-type wells and n-type wells, may be formed within each area that is laterally enclosed by a portion of the shallow trench isolation structures 720. Field effect transistors (AT, MT) may be formed over the top surface of the semiconductor material layer 9. The field effect transistors may comprise access transistors AT and monitor transistors MT. A two-dimensional array of access transistors AT may be formed in a memory array region including an array 100 of memory cells 101, and at least one additional access transistor AT may be formed in a memory monitor device region that contains a memory monitor device 200.

For example, each field effect transistor (AT, MT) may include a source region 732, a drain region 738, a semiconductor channel 735 that includes a surface portion of the substrate 8 extending between the source region 732 and the drain region 738, and a gate structure 750. The semiconductor channel 735 may include a single crystalline semiconductor material. Each gate structure 750 may include a gate dielectric layer 752, a gate electrode 754, a gate cap dielectric 758, and a dielectric gate spacer 756. The gate electrode 754 of the monitor transistor MT is herein referred to as a monitor gate electrode 754M. A source-side metal-semiconductor alloy region 742 may be optionally formed on each source region 732, and a drain-side metal-semiconductor alloy region 748 may be optionally formed on each drain region 738. A source region 732 and an optional source-side metal semiconductor alloy region 742 of each field effect transistor (AT, MT) is herein referred to as a source structure (732, 742). A drain region 738 and an optional drain-side metal semiconductor alloy region 748 of each field effect transistor (AT, MT) is herein referred to as a drain structure (738, 748). While the present disclosure is described using planar field effect transistors, embodiments are expressly contemplated in which fin field effect transistors, gate-all-around field effect transistors, or field effect transistors having different configurations are used in lieu of planar field effect transistors.

In one embodiment, the substrate 8 may include a single crystalline silicon substrate, and the field effect transistors (AT, MT) may include a respective portion of the single crystalline silicon substrate as a semiconducting channel. As used herein, a "semiconducting" element refers to an element having electrical conductivity in the range from $1.0 \times 10^{-6}$ S/cm to $1.0 \times 10^{5}$ S/cm. As used herein, a "semiconductor material" refers to a material having electrical conductivity in the range from $1.0 \times 10^{-6}$ S/cm to $1.0 \times 10^{5}$ S/cm in the absence of electrical dopants therein, and is capable of producing a doped material having electrical conductivity in a range from 1.0 S/cm to $1.0 \times 10^{5}$ S/cm upon suitable doping with an electrical dopant. In embodiments in which the semiconductor material layer 9 includes a single crystalline semiconductor material such as single crystalline silicon, the semiconductor channel 735 of each field effect transistor (AT, MT) may include a single crystalline semiconductor channel such as a single crystalline silicon channel. In one embodiment, each access transistor AT may include a respective source node that is subsequently electrically connected to a node of a respective memory structure to be subsequently formed.

Various metal interconnect structures embedded within dielectric material layers are formed over the substrate 8 and the field effect transistors (AT, MT). In an illustrative example, the dielectric material layers may include, a first dielectric material layer 601 (also referred to as a contact-level dielectric material layer 601) that surrounds contact via structures contacting the source structures (732, 742) and the drain structures (738, 748), a first interconnect-level dielectric material layer 610, and a second interconnect-level dielectric material layer 620. The metal interconnect structures may include device contact via structures 612 formed in the first dielectric material layer 601 and contact a respective component of the field effect transistors (AT, MT), first metal line structures 618 formed in the first interconnect-level dielectric material layer 610, first metal via structures 622 formed in a lower portion of the second interconnect-level dielectric material layer 620, and second metal line structures 628 formed in an upper portion of the second interconnect-level dielectric material layer 620.

Each of the dielectric material layers (601, 610, 620) may include a dielectric material such as undoped silicate glass, a doped silicate glass, organosilicate glass, amorphous fluorinated carbon, porous variants thereof, or combinations thereof. Each of the metal interconnect structures (612, 618, 622, 628) may include at least one conductive material, which may be a combination of a metallic liner (such as a metallic nitride or a metallic carbide) and a metallic fill material. Each metallic liner may include TiN, TaN, WN, TiC, TaC, and WC, and each metallic fill material portion may include W, Cu, Al, Co, Ru, Mo, Ta, Ti, alloys thereof, and/or combinations thereof. Other suitable metallic liner and metallic fill materials within the contemplated scope of disclosure may also be used. In one embodiment, the first metal via structures 622 and the second metal line structures 628 may be formed as integrated line and via structures by a dual damascene process. The dielectric material layers (601, 610, 620) are herein referred to as lower-lower-level dielectric material layers. The metal interconnect structures (612, 618, 622, 628) located within in the lower-level dielectric material layers are herein referred to as lower-level metal interconnect structures.

Memory structures M may be formed in the dielectric material layers (601, 610, 620) in a manner that provides one of the semiconductor circuit designs discussed with respect to FIGS. 1A, 1B, and 1C above. As such, each memory structure M may be formed such that a source node of the memory structure M is electrically connected to the source structure (732, 742) of a respective one of the access transistors AT, which are provided in the memory array region and in the memory monitor device region. In one embodiment, each memory structure M may be comprise a capacitor structure 660 that includes a respective first electrode 662 that is electrically connected to a source structure (732, 742) of a respective instance of the access transistor AT, a respective node dielectric layer 664, and a respective second electrode 666.

In the first structure, the substrate 8 comprises a semiconductor material layer 9, and each instance of the access transistor AT comprises a respective single crystalline semiconductor channel. The at least one monitor transistor MT has a respective monitor gate electrode 754M. Instances of a memory structure (M; 660) configured to store a respective data bit therein are formed. Electrical connections are formed to and from the instances of the access transistor AT, the at least one monitor transistor MT, and the instances of the memory structure (M; 660) such that an array 100 of memory cells 101 and a memory monitor device 200 are formed.

In one embodiment, a metal via structure (such as a device contact via structure 612) on the source structure (732, 742) may be formed on each instance of the access transistor AT. In one embodiment, each instance of the memory structure (M; 660) comprises a first electrode 662, a node dielectric layer 664, and a second electrode 666, and the first electrode 662 of each instance of the memory structure (M; 660) is electrically connected to the source structure (732, 742) of a respective instance of the access transistor AT through the metal via structure (612 or 652). In one embodiment, the bit lines 628B may comprise a subset of the second metal line structures 628, or alternatively, as a subset of the first metal line structures 618.

In the first structure, an array 100 of memory cells 101 may be located over a substrate 8. Each of the memory cells 101 comprises a respective instance of an access transistor AT and a respective instance of a memory structure (M; 660) configured to store a data bit and electrically connected to a source structure (732, 742) of the respective instance of the access transistor AT. A memory monitor device 200 may be provided, which comprises at least one additional instance of the access transistor AT, at least one additional instance of the memory structure (M; 660) that is electrically connected to a source structure (732, 742) of a respective one of the at least one additional instance of the access transistor AT, and at least one monitor transistor MT having a respective monitor gate electrode 754M that is electrically connected to the source structure (732, 742) of a respective one of the at least one additional instance of the access transistor AT.

In one embodiment, a monitor gate electrode 754M of the at least one monitor transistor MT may be electrically connected to the source structure (732, 742) of a respective instance of the access transistor AT by forming at least one metal via structure and at least one metal line (between the monitor gate electrode 754M and the source structure (732, 742). In one embodiment, each monitor gate electrode 754M of the at least one monitor transistor MT is electrically connected to the source structure (732, 742) of a respective one of the at least one additional instance of the access transistor AT through at least one metal via structure (such as at least one device contact via structure 612) and at least one metal line (such as at least one first metal line structure 618). For example, a combination of a source contact via structure 6121 that contacts a source structure (732, 742), a connection metal line structure 648C that contacts a top surface of the source contact via structure 6121, and a gate contact via structure 6122 that contacts a bottom surface of the connection metal line structure 648C and a monitor gate electrode 754M may be used to provide an electrically conductive path between each electrically connected pair of a source structure (732, 742) and a monitor gate electrode 754M.

In one embodiment, each memory structure M may comprise a capacitor structure 660, and the first electrode 662 of each instance of the memory structure (M; 660) may be electrically connected to the source structure (732, 742) of a respective instance of the access transistor AT through a metal via structure (such as a device contact via structure 612), which may be the same as, or may be different from, a source contact via structure 6121.

Figure 3A:
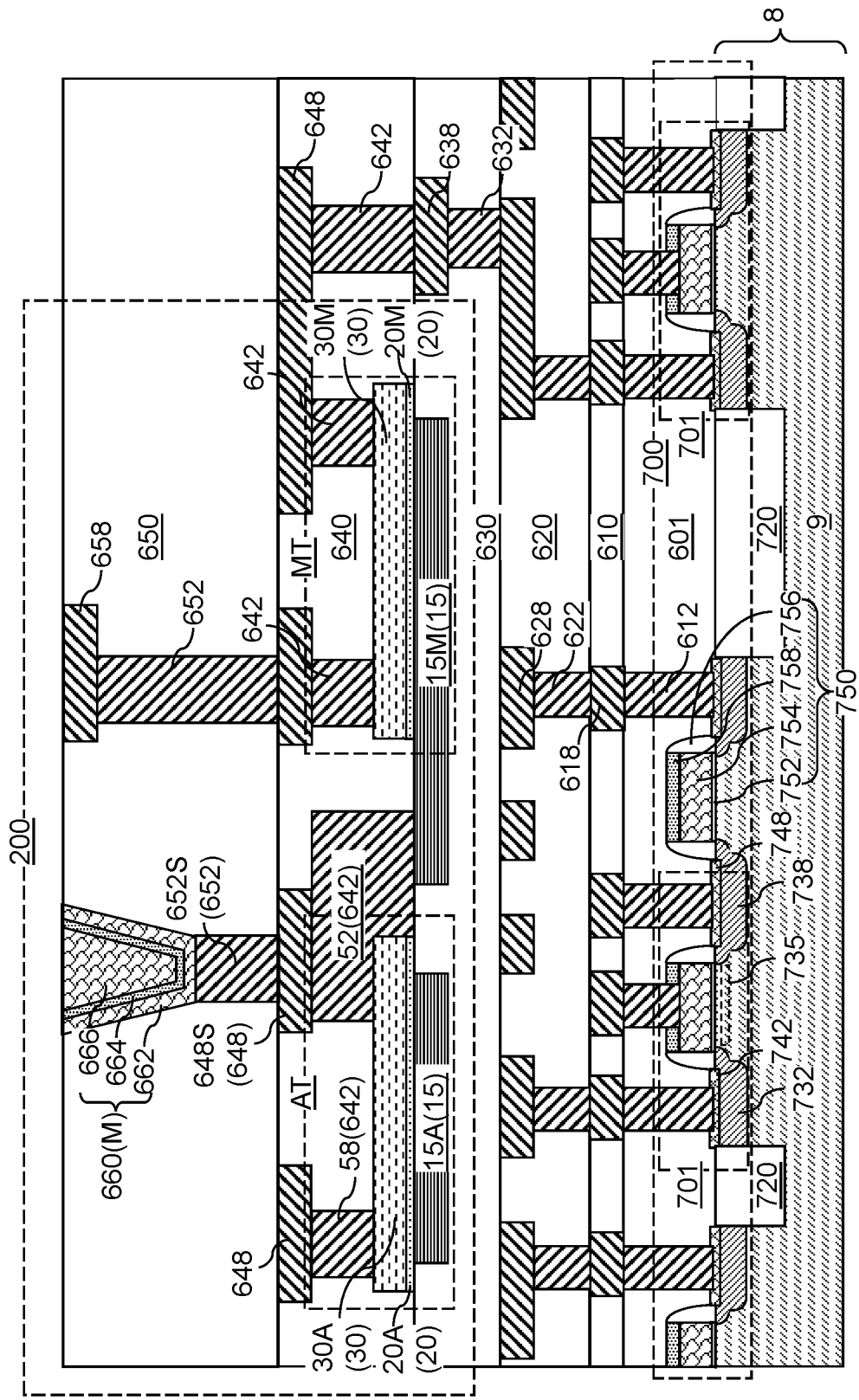
FIGS. 3A-3E are vertical cross-sectional view of various configurations of a memory monitor device region of a second semiconductor structure according to an embodiment of the present disclosure.
Figure 3B:
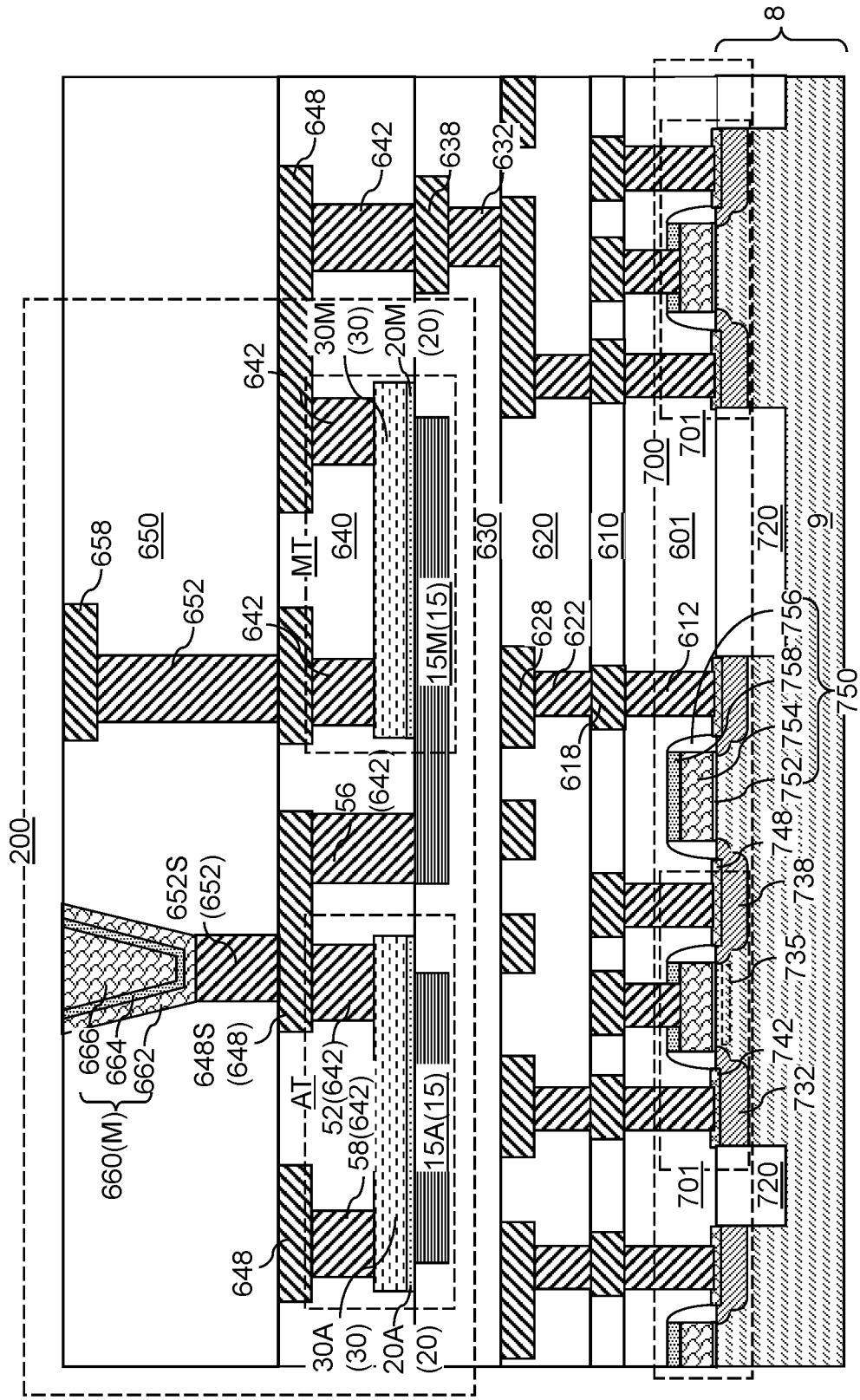
Figure 3C:
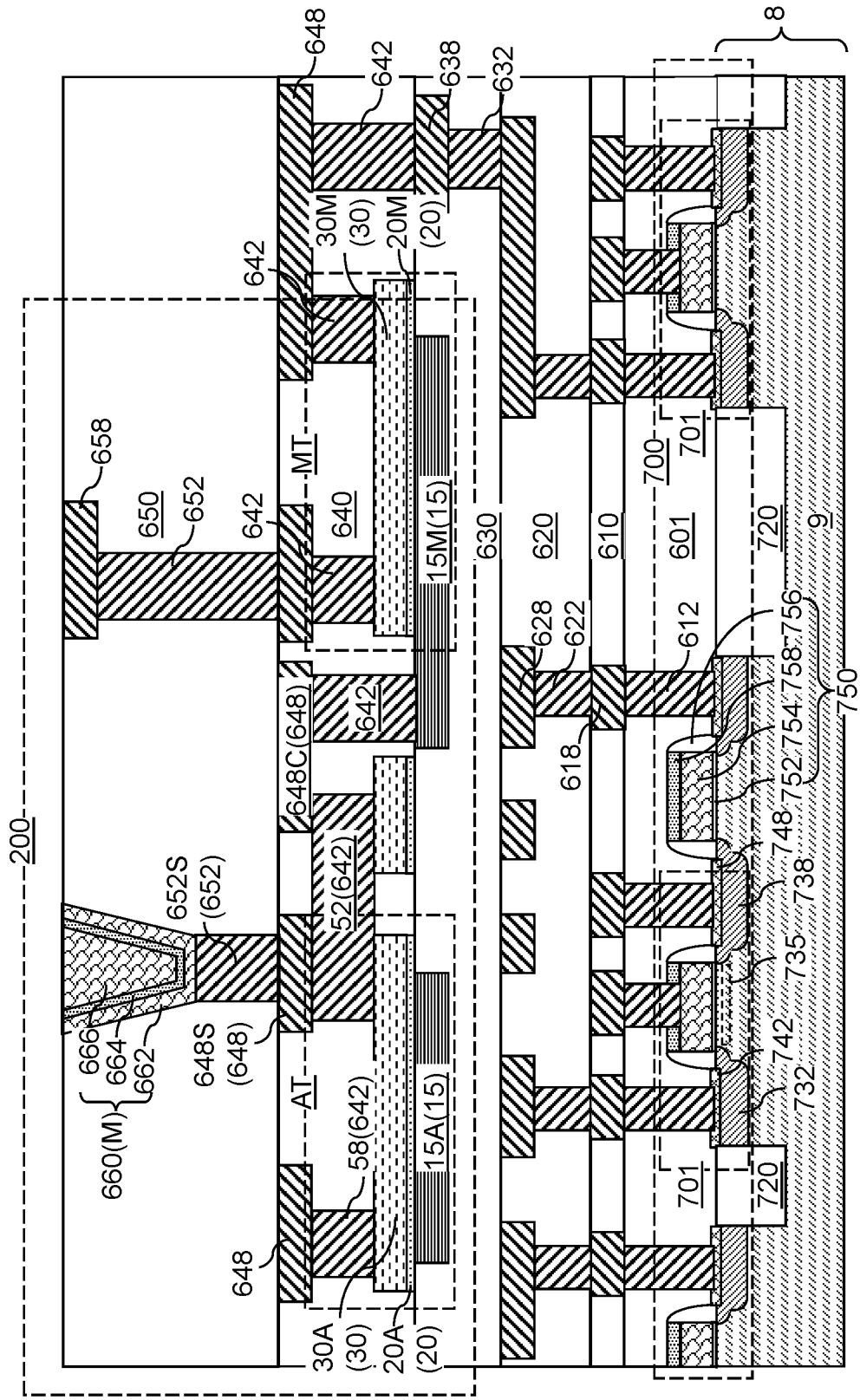
Figure 3D:
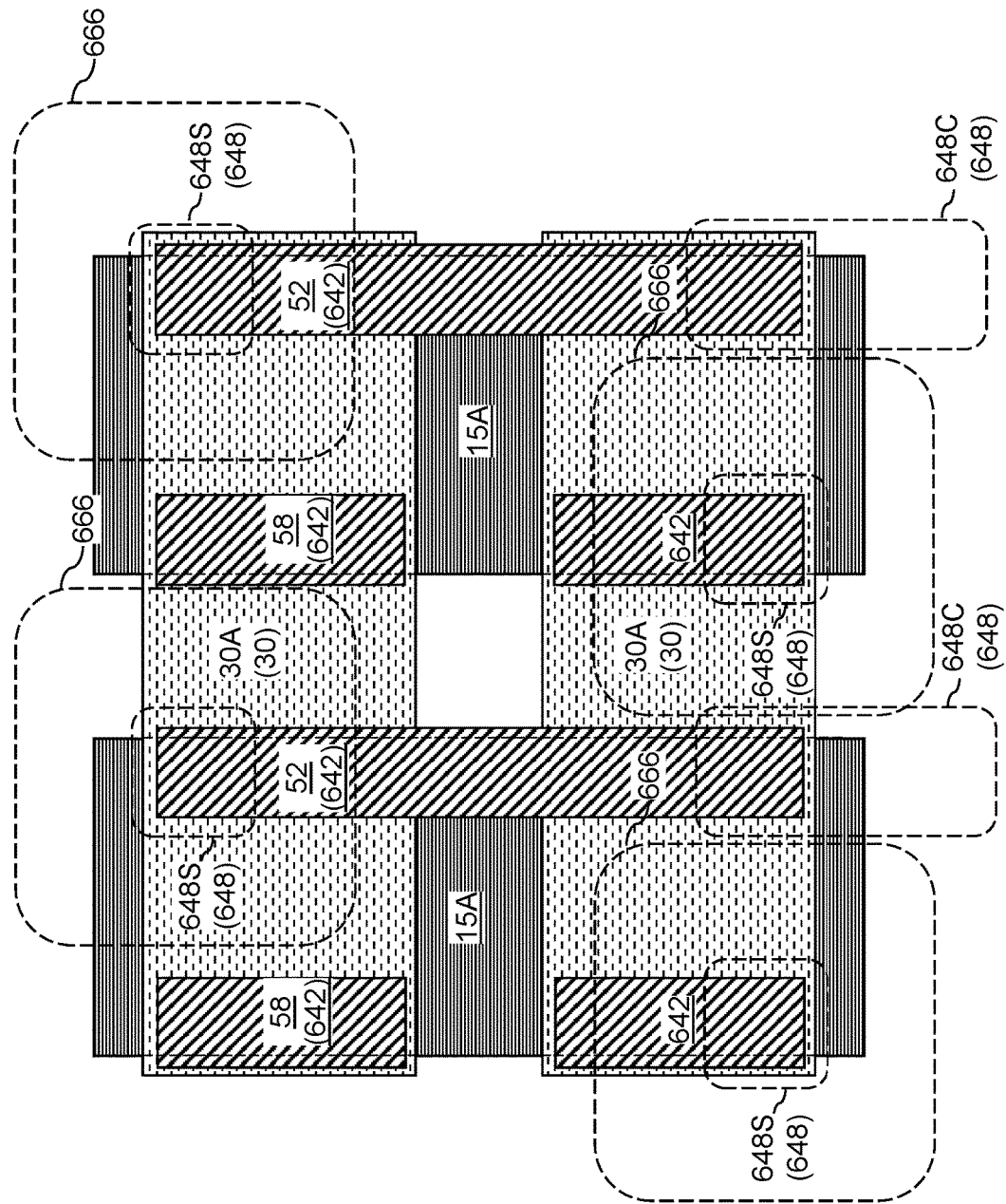
Figure 3E:
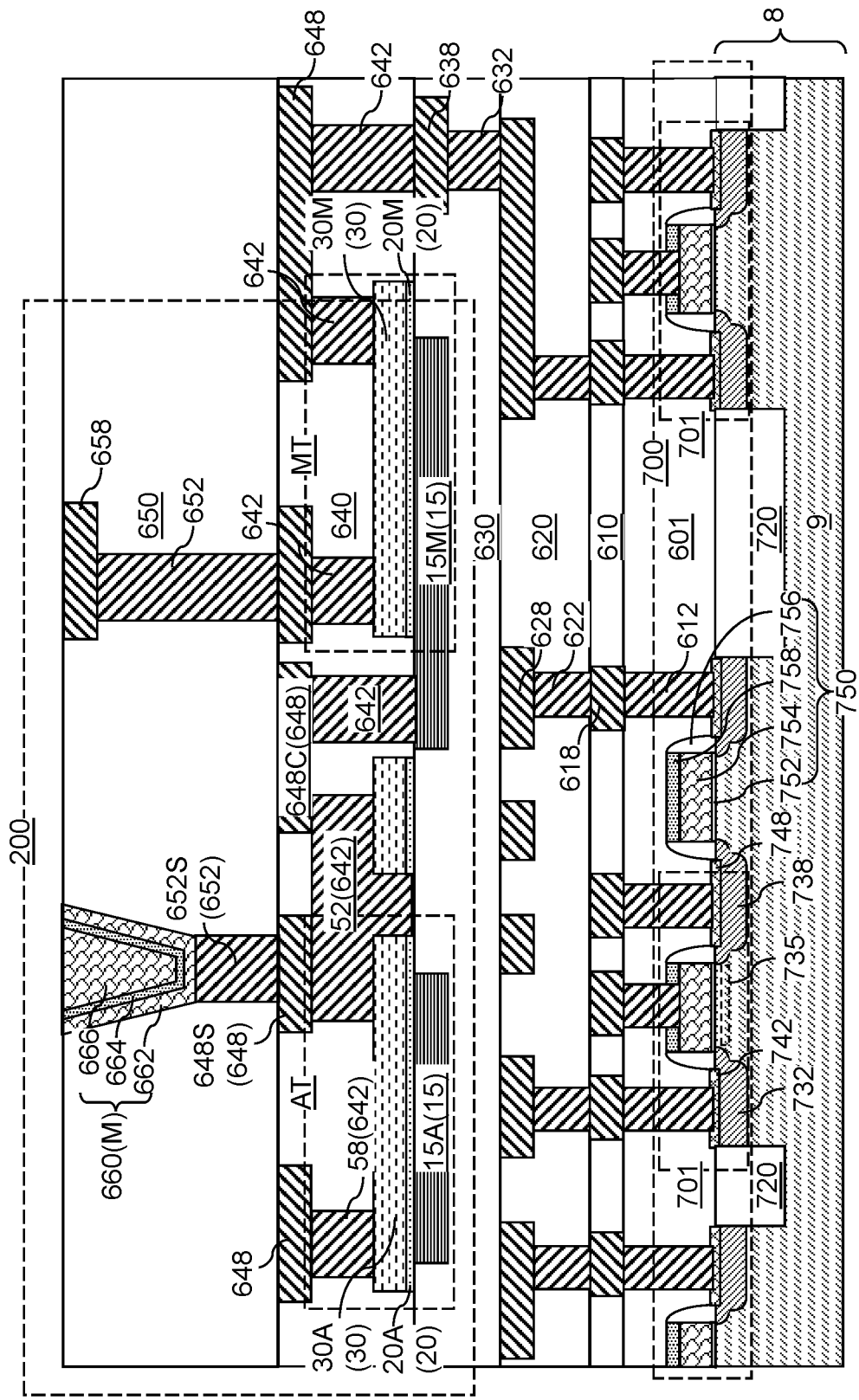
Figure 3F:
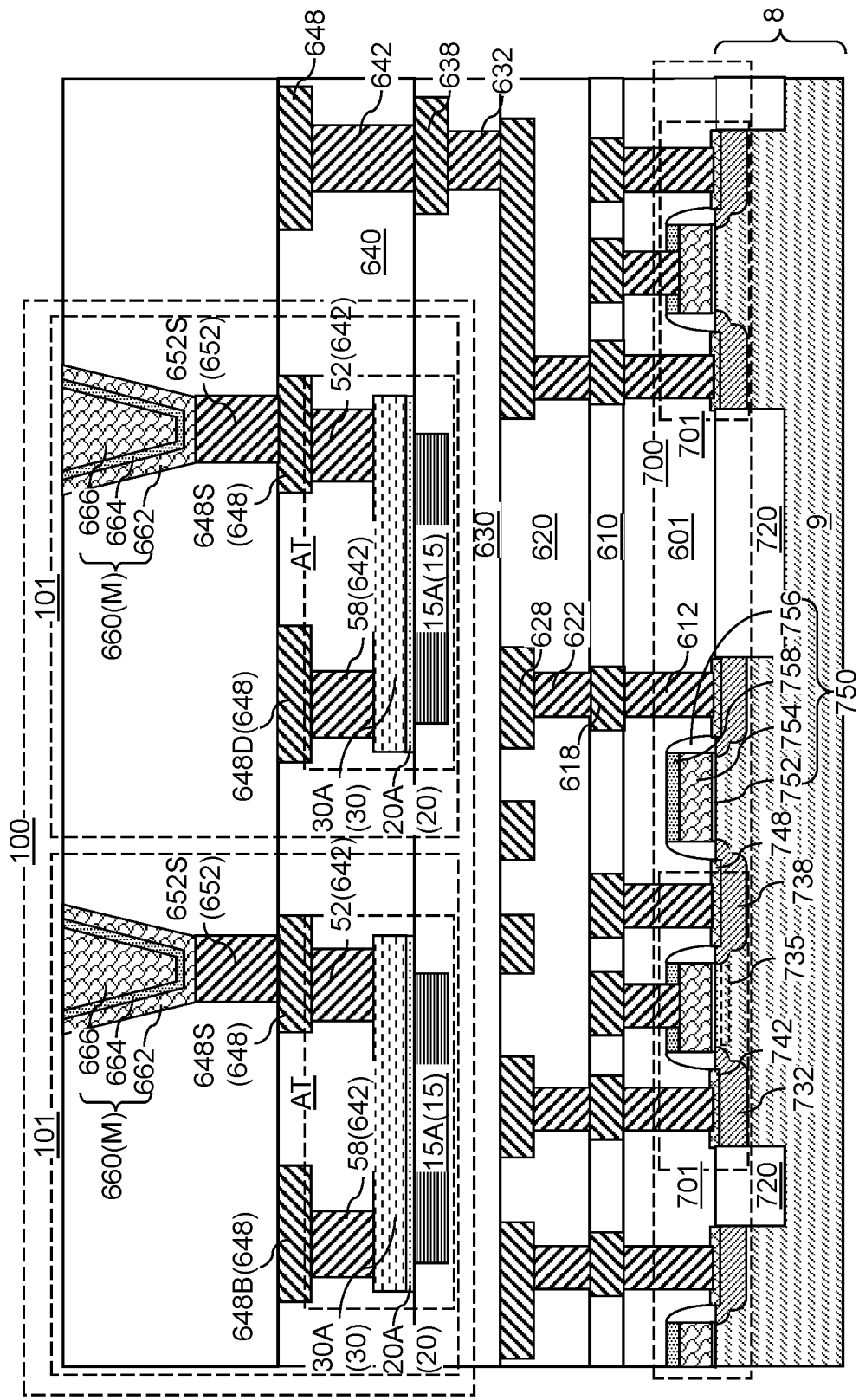
FIG. 3F is a vertical cross-sectional view of a memory array region of the second semiconductor structure according to an embodiment of the present disclosure.

Referring to FIGS. 3A-3F, various regions and configurations of a second semiconductor structure according to an embodiment of the present disclosure is illustrated. FIGS. 3A, 3B, 3C, and 3E are vertical cross-sectional view of various configurations of a memory monitor device region of the second semiconductor structure. FIG. 3D is a schematic top-down view of a configuration of the second structure illustrated in FIG. 3C. FIG. 3F is a vertical cross-sectional view of a memory array region of the second semiconductor structure. Generally, a second semiconductor structure may comprise an array 100 of memory cells 101 illustrated in FIG. 3F and any configuration of the memory monitor device 200 illustrated in FIG. 3A, FIG. 3B, FIGS. 3C and 3D, or FIG. 3E.

Generally, a second semiconductor structure may be derived from the first structure by using the field effect transistors 701 formed on the semiconductor material layer 9 for some other purposes than for the access transistors and the monitor transistors, and by forming access transistors AT and the monitor transistor(s) MT illustrated in FIG. 1A, 1B, or 1C as thin film transistors at an interconnect level that overlies at least one dielectric material layer (601, 610, 620). The field effect transistors 701 that are formed on the semiconductor material layer 9 may be used for a logic circuit or for another memory array such as an array of static random access memory (SRAM).

In addition to formation of the field effect transistors 701 for purposes other than the access transistors AT and the monitor transistors MT, the second structure includes additional metal interconnect structures (632, 638, 642, 648, 652, 658) formed within additional dielectric material layers (630, 640, 650). In an illustrative example, the additional dielectric material layers (630, 640, 650) may include, a third interconnect-level dielectric material layer 630, a fourth interconnect-level dielectric material layer 640, and a fifth interconnect-level dielectric material layer 650. The additional metal interconnect structures (632, 638, 642, 648, 652, 658) may include second metal via structures 632 formed in a lower portion of the third interconnect-level dielectric material layer 630, third metal line structures 638 formed in an upper portion of the third interconnect-level dielectric material layer 630, third metal via structures 642 formed in a lower portion of the fourth interconnect-level dielectric material layer 640, fourth metal line structures 648 formed in an upper portion of the fourth interconnect-level dielectric material layer 640, fourth metal via structures 652 formed in a lower portion of the fifth interconnect-level dielectric material layer 650, and fifth metal line structures 658 formed in an upper portion of the fifth interconnect-level dielectric material layer 650.

Each of the additional dielectric material layers (630, 640, 650) may include a dielectric material such as undoped silicate glass, a doped silicate glass, organosilicate glass, amorphous fluorinated carbon, porous variants thereof, or combinations thereof. Each of the additional metal interconnect structures (632, 638, 642, 648, 652, 658) may include at least one conductive material, which may be a combination of a metallic liner (such as a metallic nitride or a metallic carbide) and a metallic fill material. Each metallic liner may include TiN, TaN, WN, TiC, TaC, and WC, and each metallic fill material portion may include W, Cu, Al, Co, Ru, Mo, Ta, Ti, alloys thereof, and/or combinations thereof. Other suitable metallic liner and metallic fill materials within the contemplated scope of disclosure may also be used. In one embodiment, at least one metal via structures (732, 742, 652) and a respective overlying metal line structure (638, 648, 658) may be formed as integrated line and via structures by a dual damascene process. The additional dielectric material layers (630, 640, 650) are herein referred to as upper-level dielectric material layers. The additional metal interconnect structures (632, 638, 642, 648, 652, 658) located within in the upper-level dielectric material layers (630, 640, 650) are herein referred to as upper-level metal interconnect structures.

According to an aspect of the present disclosure, thin film transistors (AT, MT) and memory structures M may be formed within the upper-level dielectric material layers (630, 640, 650). The thin film transistors (AT, MT) comprise access transistors AT and monitor transistors MT. Each of the thin film transistors (AT, MT) may comprise a gate electrode 15, a gate dielectric 20, a semiconducting metal oxide channel 30, a source structure 52, and a drain structure 58. Each of the access transistors AT comprises an access gate electrode 15A, an access gate dielectric 20A, and an access-transistor channel 30A. Each of the monitor transistors MT comprises a monitor gate electrode 15M, a monitor gate dielectric 20M, and a monitor-transistor channel 30M. Each of the access gate electrodes 15A may be a portion of a respective word line within the array 100 of memory elements 101.

Each of the gate electrodes 15 may comprise patterned portions of a gate conductor layer, which may be a metal layer including a gate electrode metal. The gate dielectrics 20 comprise a gate dielectric material such as silicon oxide and/or at least one dielectric metal oxide.

The semiconducting metal oxide channels 30 comprise a semiconducting material. The semiconducting metal oxide channels 30 may be formed by depositing and patterning a polycrystalline semiconducting metal oxide layer. Each instance of the access transistor AT comprises a respective polycrystalline semiconducting metal oxide channel 30 including a respective patterned portion of the polycrystalline semiconducting metal oxide layer. Examples of semiconducting materials that may be used for the semiconducting metal oxide channels 30 include, but are not limited to, indium gallium zinc oxide (IGZO), indium tungsten oxide, indium zinc oxide, indium tin oxide, gallium oxide, indium oxide, doped zinc oxide, doped indium oxide, doped cadmium oxide, and various other doped variants derived therefrom. Alternatively, amorphous silicon, polysilicon, or a silicon-germanium alloy may be used for the semiconducting metal oxide channels 30. In one embodiment, the semiconducting metal oxide channels 30 may be polycrystalline semiconducting metal oxide channels.

The source structures 52 and the drain structures 58 may be formed as a subset of the upper-level metal interconnect structures (632, 638, 642, 648, 652, 658). In the illustrated examples, the source structures 52 and the drain structures 58 may be formed as a subset of the third metal via structures 642. According to an aspect of the present disclosure, the metal interconnect structures (632, 638, 642, 648, 652, 658) may be used to provide the electrical connections described with reference to FIG. 1A, 1B, or 1C. A subset of the metal interconnect structures (632, 638, 642, 648, 652, 658), such as a subset of the fourth metal line structures 648, may be used as bit lines 648B. The second electrodes 666 of each capacitor structure 660 may be electrically grounded, for example, by a subset (not illustrated) of the metal interconnect structures (632, 638, 642, 648, 652, 658).

While the present disclosure is described using an embodiment in which the thin film transistors (AT, MT) are formed at the level of the fourth interconnect-level dielectric material layer 640, the thin film transistors (AT, MT) may be formed at any interconnect level that overlies the field effect transistors 701 and embedded within a respective back-end-of-line (BEOL) level, i.e., within a dielectric material layer. The source structures 52 and the drain structures 58 and structures embodying the electrical connections in the semiconductor circuit designs in FIGS. 1A, 1B, and 1C may comprise a subset of the metal interconnect structures embedded within the dielectric material layers located at the same level as, underneath, and/or above, the thin film transistors (AT, MT).

Memory structures M may be formed above, at the same level as, or below, the thin film transistors (AT, MT). In an illustrative example, the memory structures M may comprise capacitor structures 660. Each capacitor structure 660 may include a respective first electrode 662 that is electrically connected to the source structure 52 of a respective instance of the access transistor AT, a respective node dielectric layer 664, and a respective second electrode 666. The memory structures M may be embedded within a dielectric material layer. In the illustrated examples, the memory structures M are embedded within the fifth interconnect-level dielectric material layer 650.

A metal via structure (such as a source-connection metal via structure 652S) may be formed on the source structure 52 of each instance of the access transistor AT. In one embodiment, the first electrode 662 of each instance of the memory structure (M; 660) is electrically connected to the source structure 52 of a respective instance of the access transistor AT through at least a metal via structure (such as a source-connection metal via structure 652S). In one embodiment, the first electrode 662 of each capacitor structure 660 may be electrically connected to the source node (comprising a source structure 52) of a respective access transistor AT through at least one metal interconnect structure, such as a combination of a metal line structure (such as a source-connection metal line 648S) and a metal via structure (such as a source-connection metal via structure 652S).

Generally, a semiconductor device in the second structure may comprise an array 100 of memory cells 101 located over a substrate 8, wherein each of the memory cells 101 comprises a respective instance of an access transistor AT and a respective instance of a memory structure (M; 660) configured to store a data bit and electrically connected to a source structure 52 of the respective instance of the access transistor AT; and a memory monitor device 200 comprising an additional instance of the access transistor AT, an additional instance of the memory structure (M; 660) that is electrically connected to a source structure 52 of the additional instance of the access transistor AT, and at least one monitor transistor MT having a respective monitor gate electrode 15M that is electrically connected to the source structure 52 of the additional instance of the access transistor AT.

A monitor gate electrode 15M of each monitor transistor MT may be electrically connected to the source structure 52 of a respective access transistor AT. In one embodiment, a monitor gate electrode 15M of the at least one monitor transistor MT of a memory monitor device 200 is electrically connected to the source structure 52 of the additional instance of the access transistor AT through at least one metal via structure 642 and at least one metal line 648 as illustrated in FIGS. 3B, 3C, 3D, and 3E. The at least one metal line 648 used to provide the electrically conductive path between the monitor gate electrode 15M of the at least one monitor transistor MT and the source structure 52 may comprise the source-connection metal line 648S as illustrated in FIG. 3B. Alternatively, the at least one metal line 648 used to provide the electrically conductive path between the monitor gate electrode 15M of the at least one monitor transistor MT and the source structure 52 may comprise a connection metal line structure 648C that is different from the source-connection metal line 648S as illustrated in FIGS. 3C, 3D, and 3E.

In another embodiment, the source structure 52 of the additional instance of the access transistor AT in the memory monitor device 200 may be formed directly on a monitor gate electrode 15M of the at least one monitor transistor MT in the memory monitor device 200. In this embodiment, a monitor gate electrode 15M of the at least one monitor transistor MT may be in contact with the source structure 52 of the additional instance of the access transistor AT as illustrated in FIG. 3A.

In one embodiment, each instance of the memory structure (M; 660) comprises a first electrode 662, a node dielectric layer 664, and a second electrode 666. The first electrode 662 of the additional instance of the memory structure (M; 660) is electrically connected to the source structure 52 of the additional instance of the access transistor AT through at least a metal via structure (such as a source-connection metal via structure 652S).

In one embodiment, each instance of the access transistor AT comprises a respective polycrystalline semiconducting metal oxide channel (such as an access-transistor channel 30A).

In one embodiment, the at least one monitor transistor MT comprises a plurality of monitor transistors MT having different threshold voltages.

In embodiments in which the access transistors AT comprise thin film transistors including semiconducting metal oxide channels, a low power memory array operable using a long refresh period may be provided. In one embodiment, the source structure 52 may be laterally extended over a plurality of access-transistor channels 30A for routing purposes as illustrated in FIGS. 3C and 3D. In this embodiment, the plurality of access-transistor channels 30A may have the same periodicity as an array 100 of memory cells 101, and the circuit design for the memory monitor device 200 may be commensurate with the circuit design for the array 100 of memory cells 101 upon physical implementation in a second semiconductor structure.

In some embodiments, the memory monitor device 200 may be implemented entirely within BEOL levels without requiring any front-end-of-line (FEOL) devices such as field effect transistors 701.

Figure 4A:
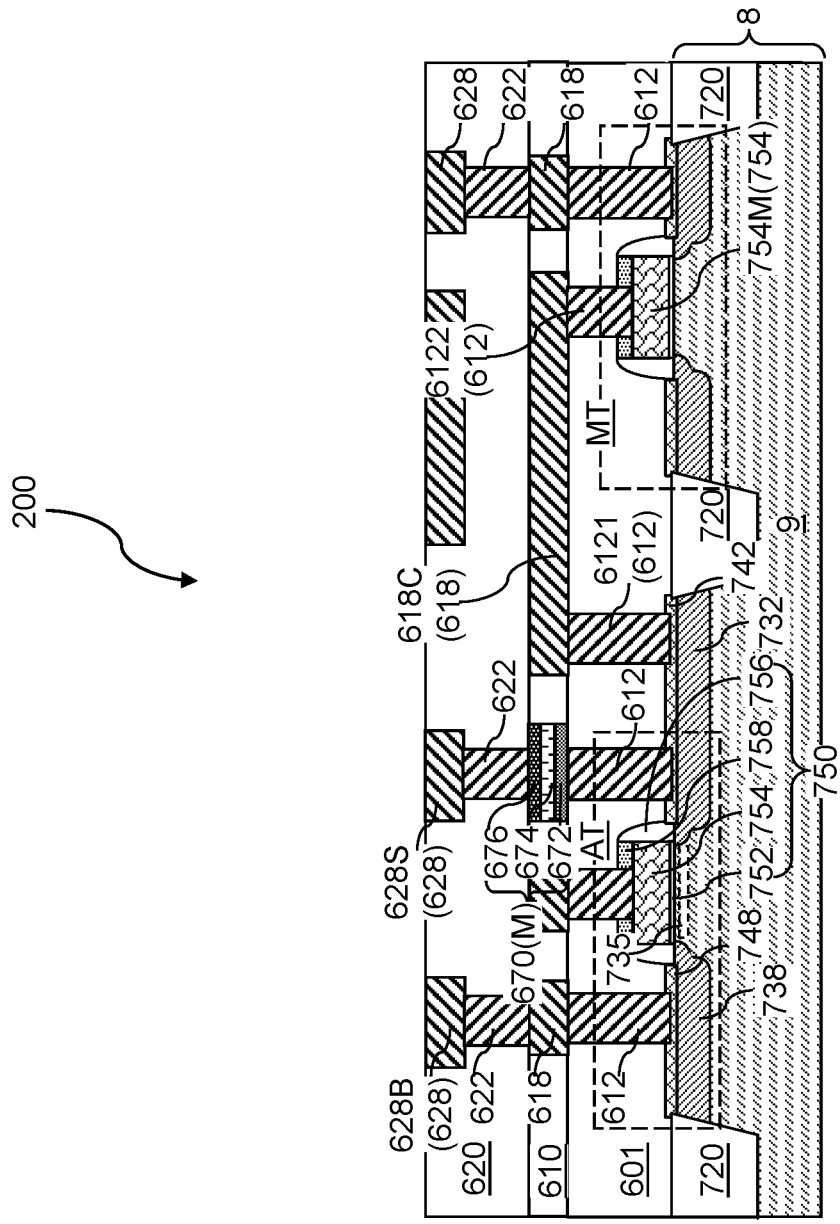
FIG. 4A is a vertical cross-sectional view of a memory monitor device region of a third semiconductor structure according to an embodiment of the present disclosure.
Figure 4B:
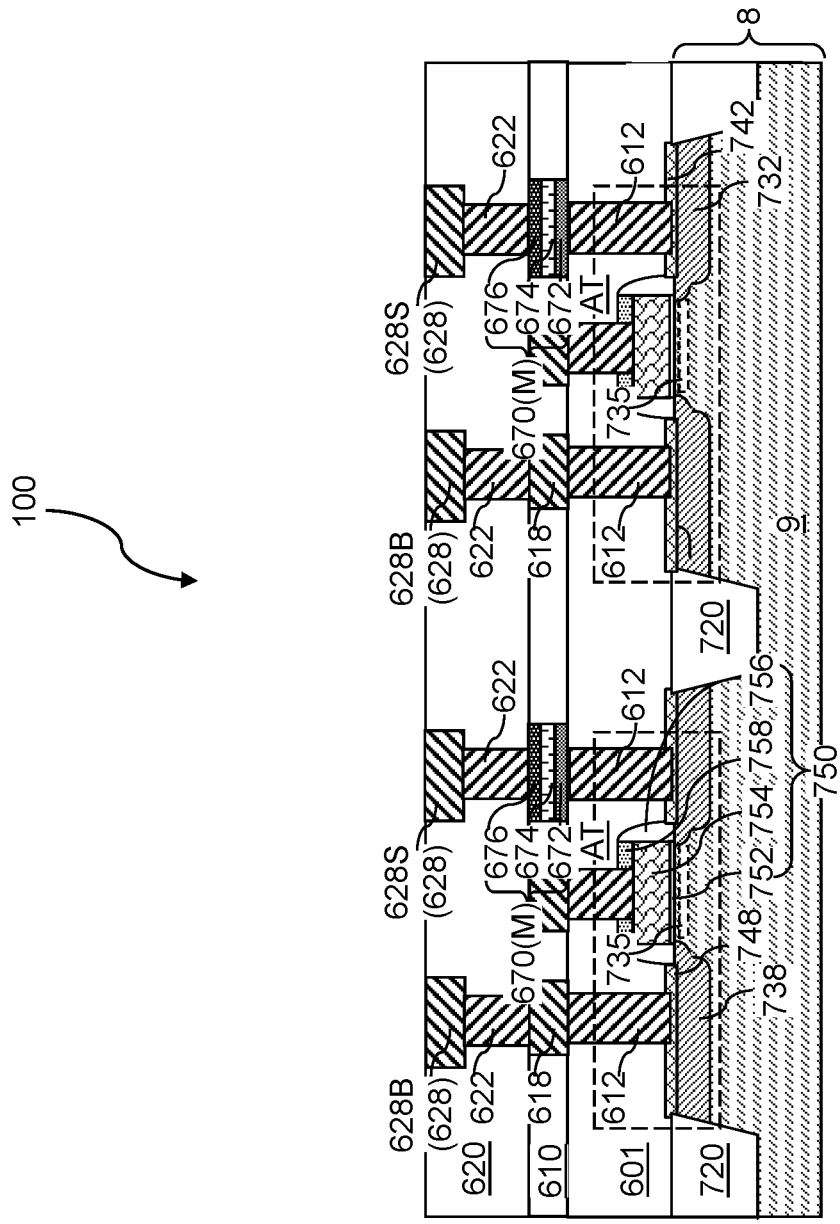
FIG. 4B is a vertical cross-sectional view of a memory array region of the third semiconductor structure according to an embodiment of the present disclosure.

Referring to FIGS. 4A and 4B, a third semiconductor structure according to an embodiment of the present disclosure. The third structure may be derived from the first structure by substituting an alternative memory structure (such as a resistive memory structure 670) for each capacitor structure 660 illustrated in FIGS. 2A and 2B. Each instance of the memory structure (M; 670) in the third structure comprises: a respective first electrode 672 that is electrically connected to the source structure 52 of a respective instance of the access transistor AT; a memory material portion 674 having at least two resistivity states exhibiting different electrical resistivities; and a respective second electrode 676.

Any resistive memory structures known in the art may be used for the resistive memory structure 670 of the present disclosure. Resistive memory devices are non-volatile memory devices that utilize a resistive switching mechanism to store data. Resistive memory devices include metal-insulator-metal (MIM) resistive memory devices, phase change memory (PCM) devices, conductive-bridging resistive memory devices, and filamentary resistive memory devices. MIM resistive memory devices utilize an insulator material having two different resistivity states. PCM devices utilize a phase change material having two different resistivity states (such as an amorphous state and a crystalline state). Conductive-bridging resistive memory devices use a conductive material, such as silver, to reversibly form a conductive filament between two electrodes. Filamentary resistive memory devices use formation of conductive filament in a dielectric metal oxide material to modulate conductivity.

Generally, any memory structure known in the art may be used for the memory structures M of the present disclosure provided that a change in the electrical potential is generated at the source node (i.e., the node of the source structure), or may be generated upon application of suitable electrical bias to a node of the memory structure M (such as the second electrode) and/or to a node of the access transistor AT in the memory monitor device 200.

Figure 4C:
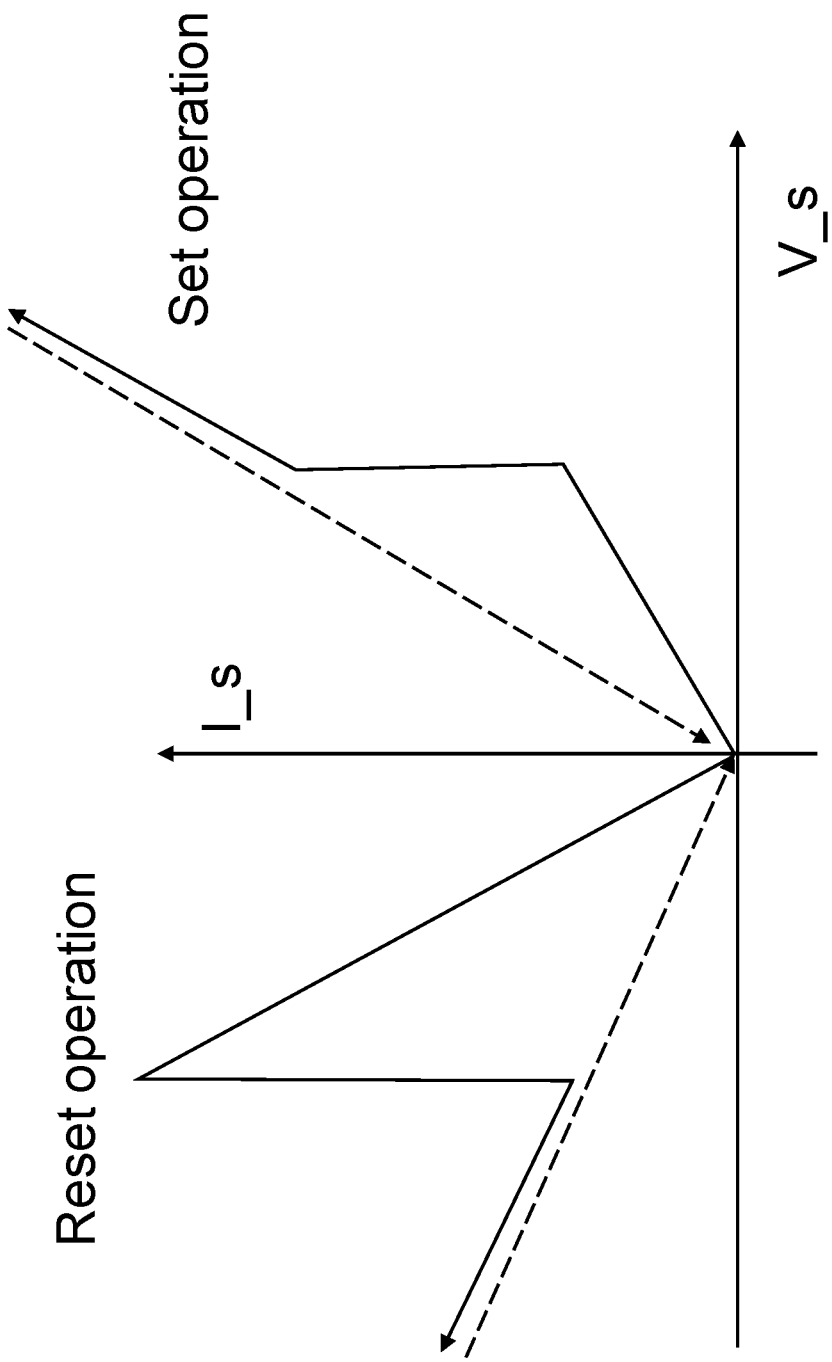
FIG. 4C is a diagram illustrating voltage-current characteristics during a set operation and a reset operation for the memory structure in the third semiconductor structure of FIGS. 4A and 4B.

FIG. 4C is a diagram illustrating voltage-current characteristics during a set operation and a reset operation for the memory structure in the third semiconductor structure of FIGS. 4A and 4B. The horizontal axis represents the bias voltage V_s that is applied across the second electrode 676 and the drain structure 58 during programming operations, and the vertical axis represents the electrical current I_s that flows between the second electrode 676 and the drain structure 58. A bias voltage of a first polarity may be applied to perform a set operation, in which a high resistivity state of a memory material portion 674 switches to a low resistivity state. A bias voltage of a second polarity (which is the opposite of the first polarity) may be applied to perform a reset operation, in which a low resistivity state of the memory material portion 674 switches to a high resistivity state. Current-voltage characteristics during ramp-down of applied voltage after the set operation or after the reset operation are illustrated in dotted lines.

During testing of the memory monitor device 200, bias voltages may be applied to the second electrode 676 and the drain structure 58 of the memory monitor device 200. When the memory material portion 674 is in a low resistivity state, the voltage at the source node (i.e., the voltage at the source structure 52) is determined almost entirely by the voltage applied to the second electrode 676, and is not significantly influenced by the voltage applied to the drain structure 58. When the memory material portion 674 is in a high resistivity state, the voltage at the source node (i.e., the voltage at the source structure 52) is not significantly influenced by the voltage applied to the second electrode 676, and is determined almost entirely by the voltage applied to the drain structure 58. By applying various combinations of bias voltages to the second electrode 676 and the drain structure 58 during testing, the device characteristics of the memory structure M may be characterized.

Figure 5A:
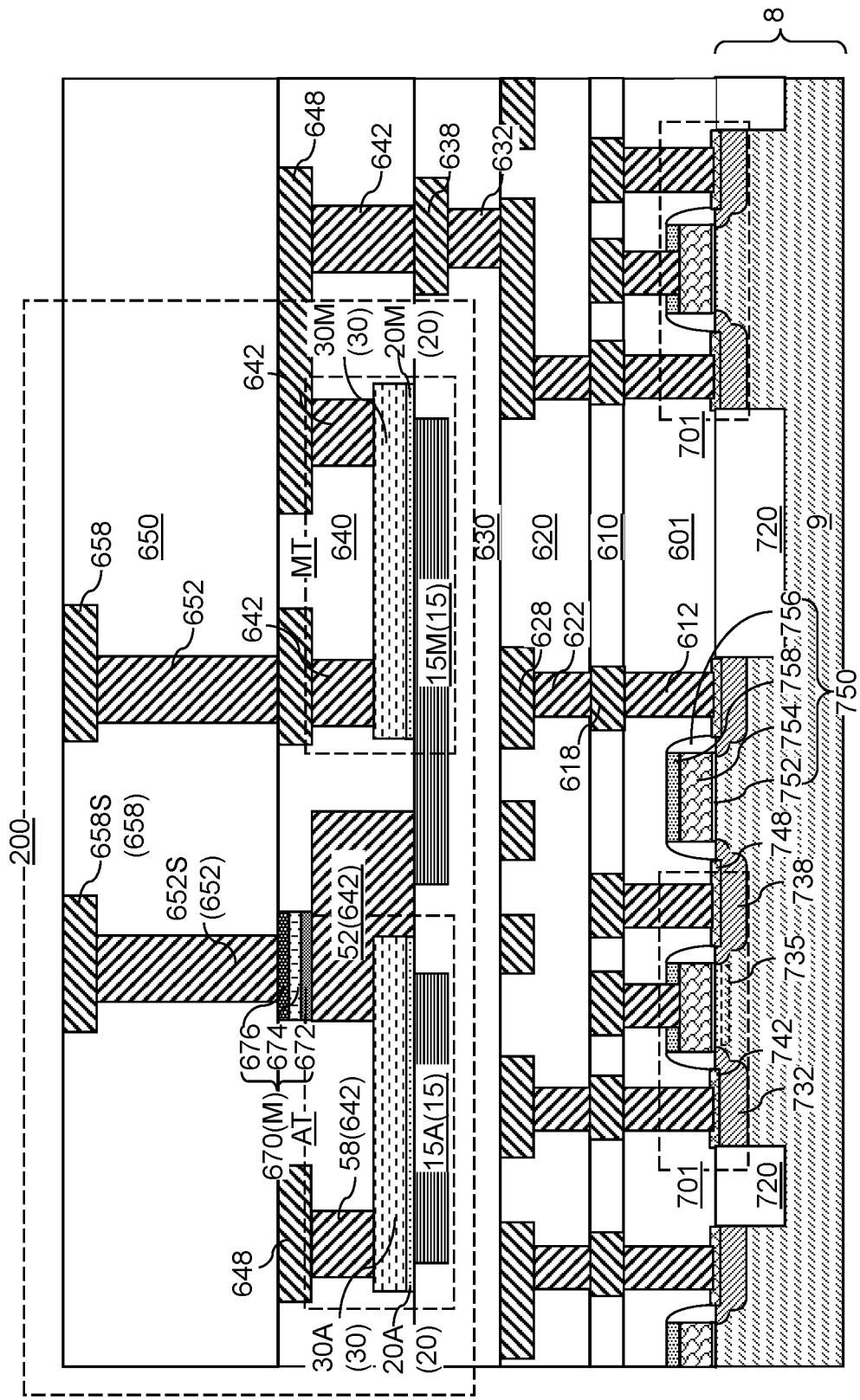
FIGS. 5A-5D are vertical cross-sectional view of various configurations of a memory monitor device region of a fourth semiconductor structure according to an embodiment of the present disclosure.
Figure 5B:
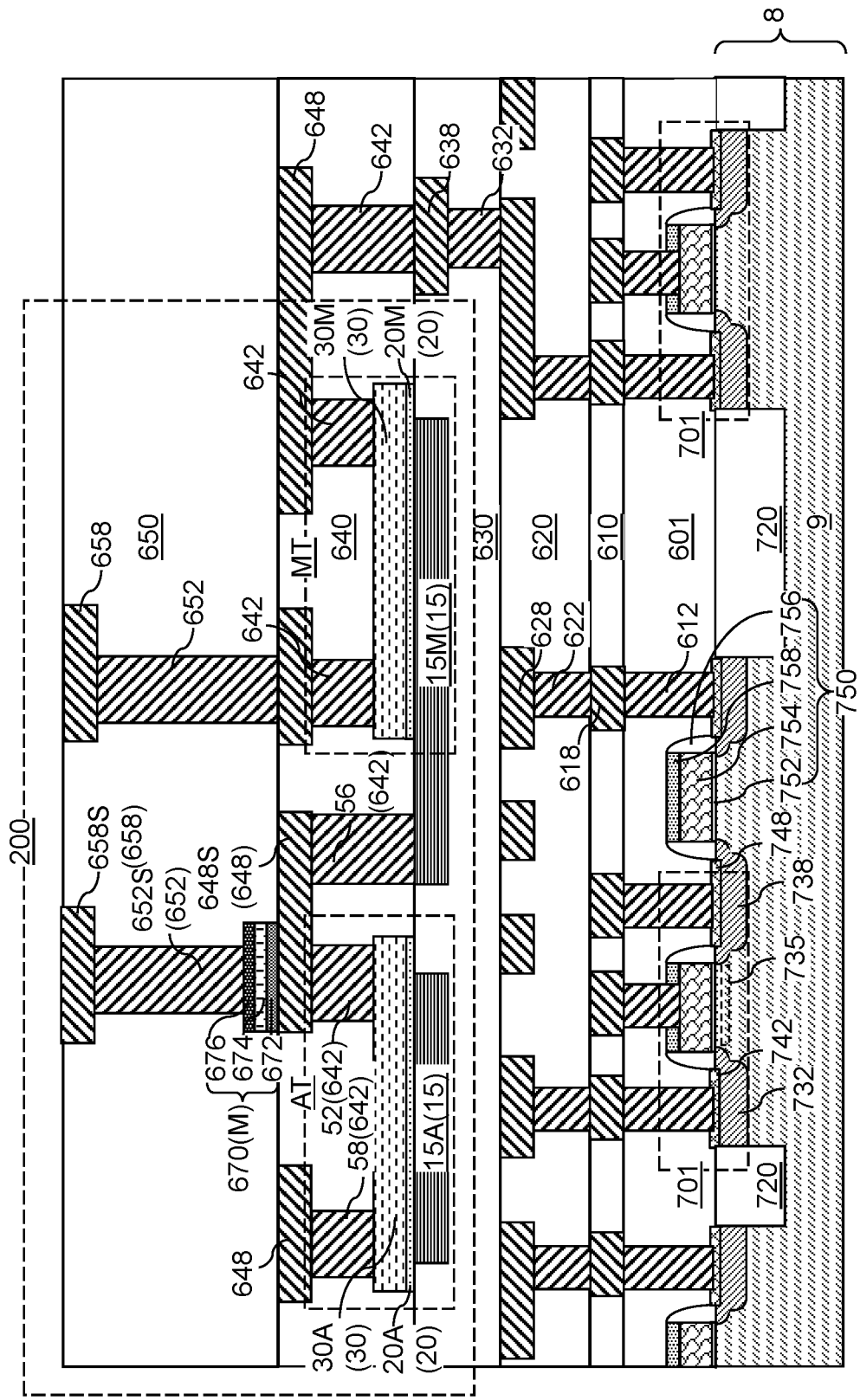
Figure 5C:
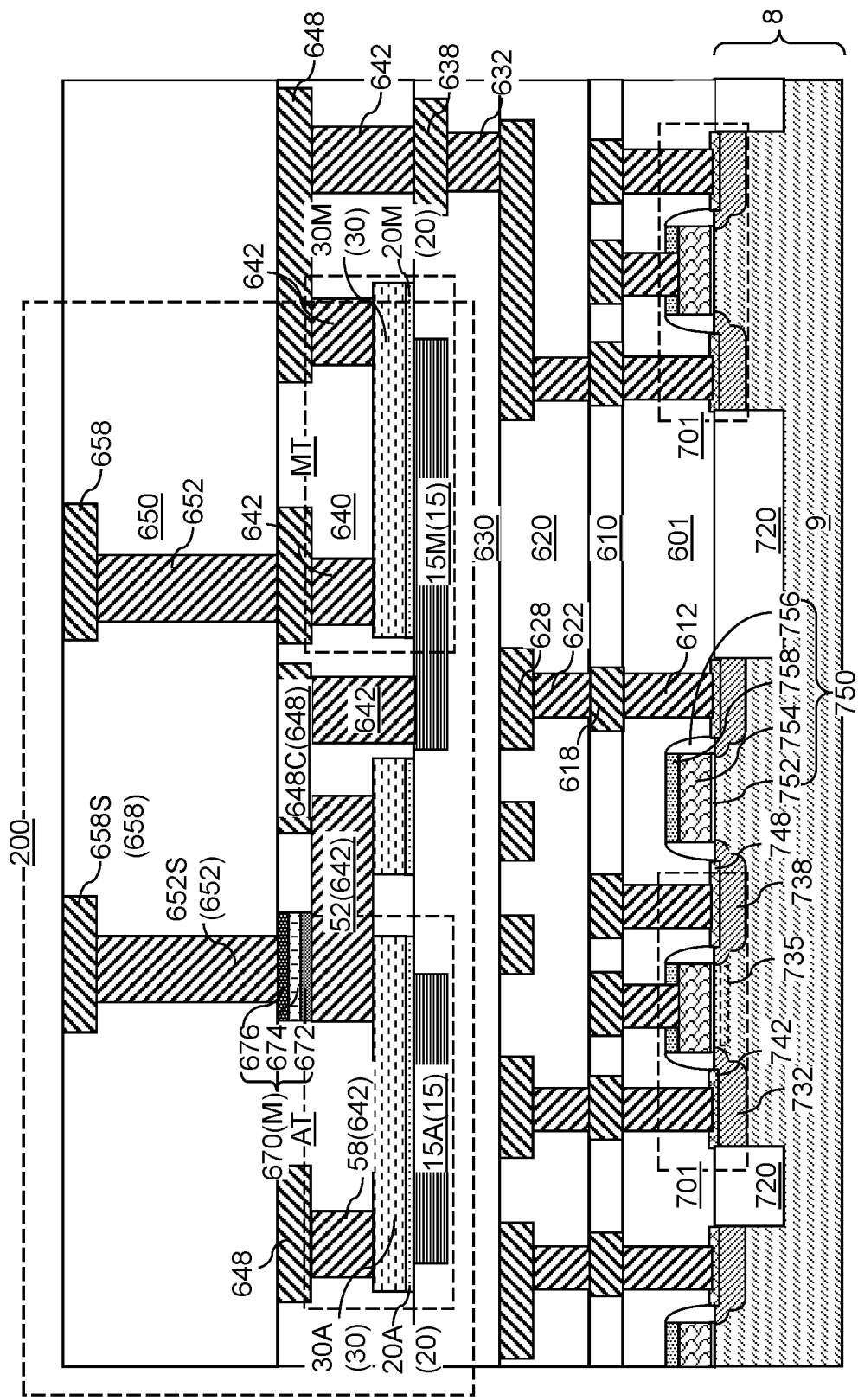
Figure 5D:
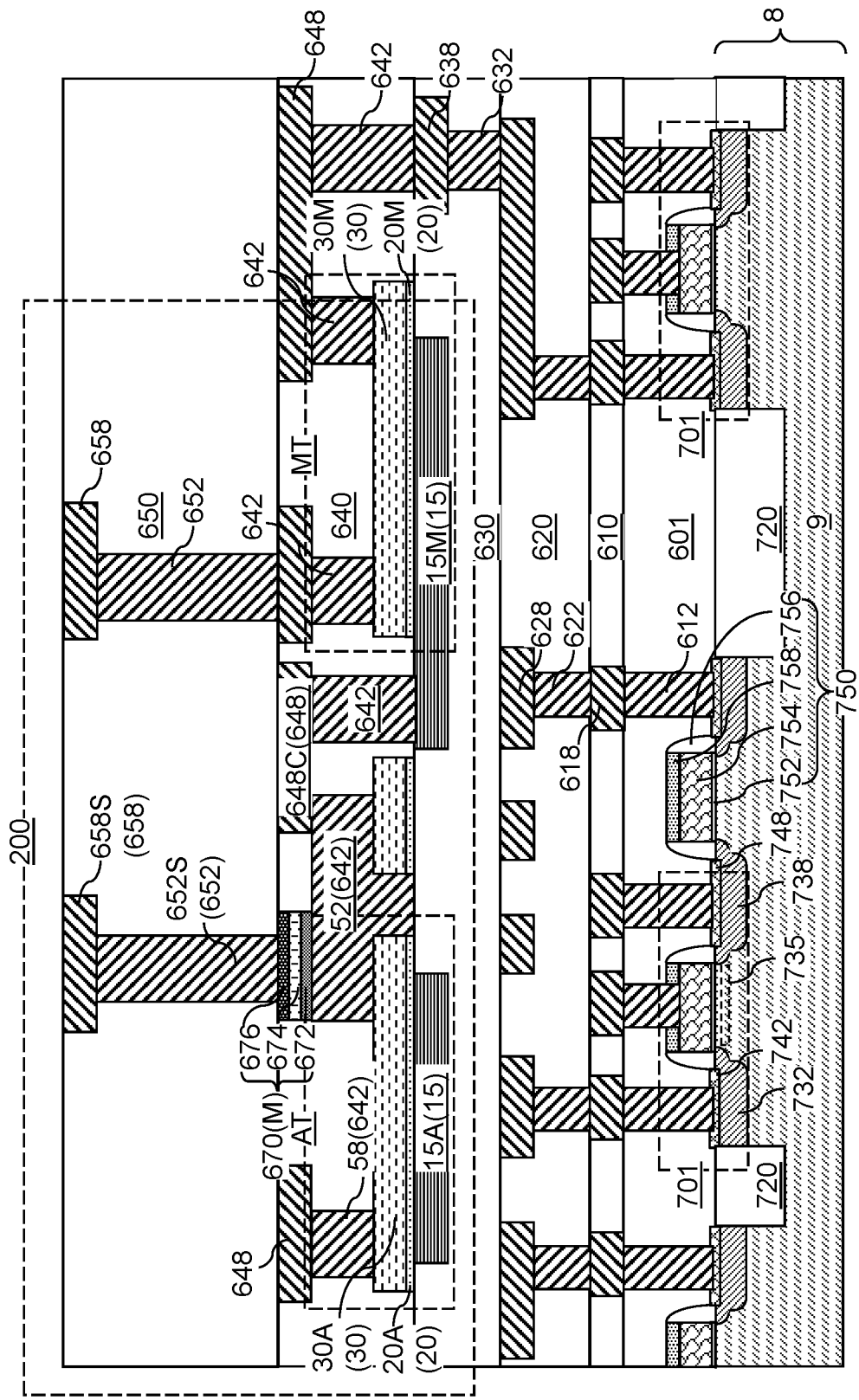

Referring to FIGS. 5A, 5B, 5C, 5D, and 5E, various configurations of a fourth semiconductor structure according to an embodiment of the present disclosure are illustrated. FIGS. 5A, 5B, 5C, and 5D are vertical cross-sectional view of various configurations of a memory monitor device region of the fourth semiconductor structure. FIG. 5E is a vertical cross-sectional view of a memory array region of the fourth semiconductor structure. Generally, a fourth semiconductor structure may comprise an array 100 of memory cells 101 illustrated in FIG. 5E and any configuration of the memory monitor device 200 illustrated in FIG. 5A, FIG. 5B, FIG. 5C, or FIG. 5D.

Generally, the various configurations of the fourth structure may be derived from the various configurations of the second structure illustrated in FIGS. 3A-3F by substituting an alternative memory structure (such as a resistive memory structure 670) for each capacitor structure 660 illustrated in FIGS. 4A-4F. Each instance of the memory structure (M; 670) in the fourth structure comprises: a respective first electrode 672 that is electrically connected to the source structure 52 of a respective instance of the access transistor AT; a memory material portion 674 having at least two resistivity states exhibiting different electrical resistivities; and a respective second electrode 676. The second electrodes 676 of the resistive memory structures 670 may be electrically connected to a respective source bias line 658S, which may be embodied, for example, as a subset of the fifth metal line structures 658 or another subset (not illustrated) of the metal interconnect structures (632, 638, 642, 648, 652, 658).

The fourth structure may be operated in the same manner as the second structure with suitable changes that accompany the substitution of the resistive memory structures 670 for the capacitor structures 660. Generally, any type of memory structure known in the art may be used in lieu of the resistive memory structure 670 for each memory cell 101 and for each memory monitor device 200 in the fourth structure. The memory structures M may be formed at a suitable metal interconnect level.

Figure 6:
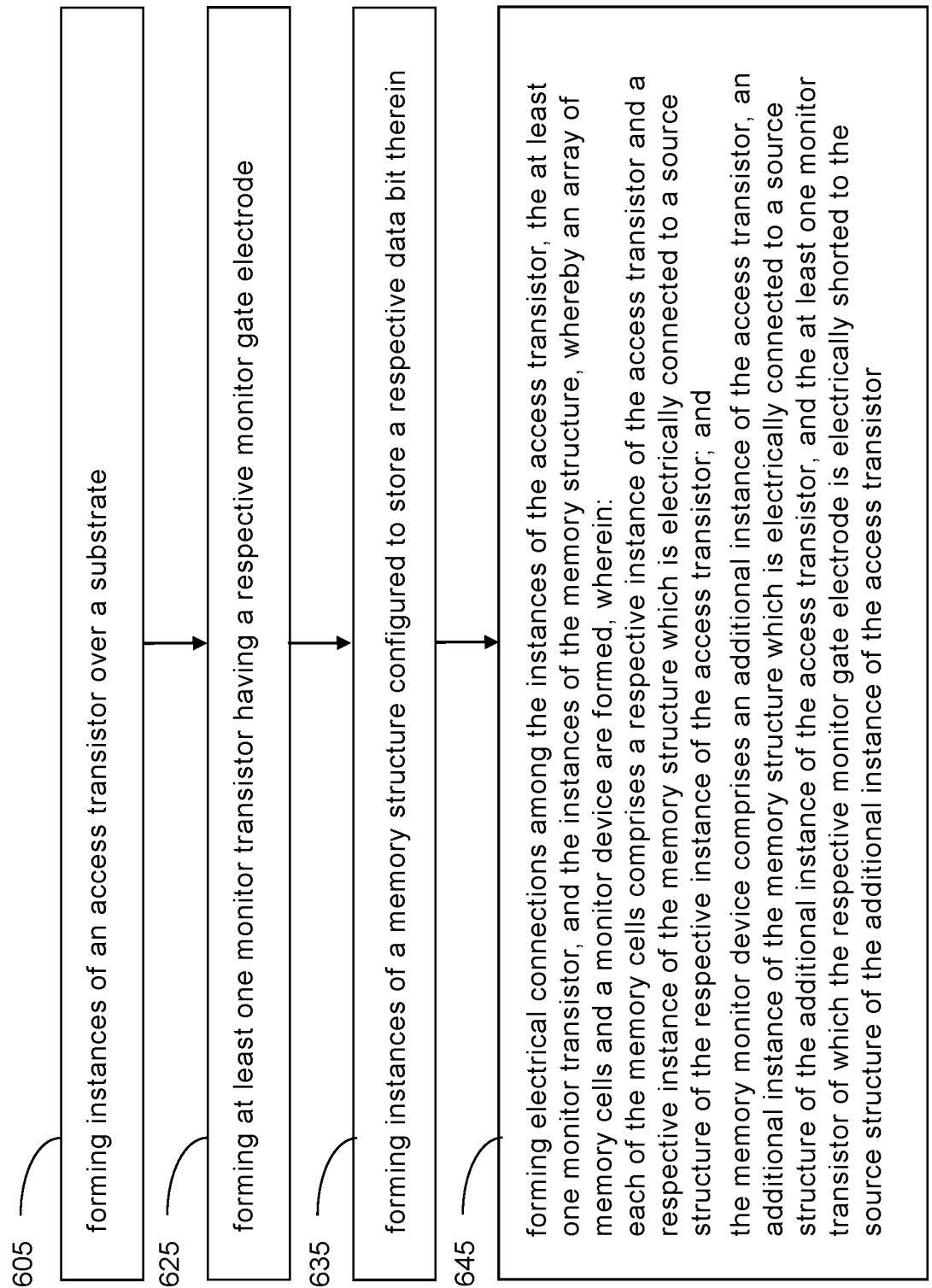
FIG. 6 is a flowchart that illustrates the general processing steps for manufacturing the semiconductor structures of the present disclosure.

Referring to FIG. 6, a flowchart illustrates the general processing steps for manufacturing semiconductor structures of the present disclosure.

Referring to step 605 and FIGS. 1-4B and 5A-5E, instances of an access transistor AT may be formed over a substrate 8.

Referring to step 625 and FIGS. 1-4B and 5A-5E, at least one monitor transistor MT having a respective monitor gate electrode (754M or 15M) may be formed.

Referring to step 635 and FIGS. 1-4B and 5A-5E, instances of a memory structure (M; 660 or 670) may be formed, which may be configured to store a respective data bit therein.

Referring to step 645 and FIGS. 1-4B and 5A-5E, electrical connections to and from the instances of the access transistor AT, the at least one monitor transistor MT, and the instances of the memory structure (M; 660 or 670) may be formed prior to, and/or after, formation of the instances of the memory structure (M; 660 or 670). An array 100 of memory cells 101 and a memory monitor device are formed. In one embodiment, each of the memory cells 101 comprises a respective instance of the access transistor AT and a respective instance of the memory structure (M; 660 or 670) which is electrically connected to a source structure {(732, 742) or 52} of the respective instance of the access transistor AT. In one embodiment, the memory monitor device 200 comprises an additional instance of the access transistor AT, an additional instance of the memory structure (M; 660 or 670) which is electrically connected to a source structure {(732, 742) or 52} of the additional instance of the access transistor AT, and the at least one monitor transistor MT of which the respective monitor gate electrode (754M or 15M) is electrically connected ( ) to the source structure {(732, 742) or 52} of the additional instance of the access transistor AT.

Referring to all drawings and according to various embodiments of the present disclosure, a semiconductor device is provided, which comprises: an array 100 of memory cells 101 located over a substrate 8, wherein each of the memory cells 101 comprises a respective instance of an access transistor AT and a respective instance of a memory structure (M; 660 or 670) configured to store a data bit and electrically connected to a source structure {(732, 742) or 52} of the respective instance of the access transistor AT; and a memory monitor device 200 comprising an additional instance of the access transistor AT, an additional instance of the memory structure (M; 660 or 670) that is electrically connected to a source structure {(732, 742) or 52} of the additional instance of the access transistor AT, and at least one monitor transistor MT having a respective monitor gate electrode (754M or 15M) that is electrically connected to the source structure {(732, 742) or 52} of the additional instance of the access transistor AT.

In one embodiment, a monitor gate electrode (754M or 15M) of the at least one monitor transistor MT is electrically connected to the source structure {(732, 742) or 52} of the additional instance of the access transistor AT through at least one metal via structure (612 or 642) and at least one metal line (618 or 648). In one embodiment, a monitor gate electrode (754M or 15M) of the at least one monitor transistor MT is in contact with the source structure {(732, 742) or 52} of the additional instance of the access transistor AT.

In one embodiment, each instance of the memory structure (M; 660 or 670) comprises a first electrode (662 or 672), a memory material layer 674 or a node dielectric layer 664, and a second electrode (666 or 676); and the first electrode (662 or 672) of the additional instance of the memory structure (M; 660 or 670) is electrically connected ( ) to the source structure {(732, 742) or 52} of the additional instance of the access transistor AT through a metal via structure (612 or 652).

In one embodiment, the substrate 8 comprises a semiconductor material layer 9; and each instance of the access transistor AT comprises a respective single crystalline semiconductor channel.

In one embodiment, each instance of the access transistor AT comprises a respective polycrystalline semiconducting metal oxide channel 30A.

In one embodiment, the at least one monitor transistor MT comprises a plurality of monitor transistors MT having different threshold voltages.

In one embodiment, each instance of the memory structure (M; 660 or 670) comprises a respective capacitor structure 660 including: a respective first electrode (662 or 672) that is electrically connected to the source structure {(732, 742) or 52} of a respective instance of the access transistor AT; a respective node dielectric layer 664; and a respective second electrode (666 or 676).

In one embodiment, each instance of the memory structure (M; 660 or 670) comprises: a respective first electrode (662 or 672) that is electrically connected to the source structure {(732, 742) or 52} of a respective instance of the access transistor AT; a memory material portion 674 having at least two resistivity states exhibiting different electrical resistivities; and a respective second electrode (666 or 676).

According to another aspect of the present disclosure, a non-transitory machine-readable data storage medium is provided, which is encoded with a set of data representing a semiconductor circuit design. The set of data comprises: a first data representing an array 100 of memory cells 101 located over a substrate 8, wherein each of the memory cells 101 comprises a respective instance of an access transistor AT and a respective instance of a memory structure (M; 660 or 670) configured to store a data bit and electrically connected to a source structure {(732, 742) or 52} of the respective instance of the access transistor AT; and a second data representing a memory monitor device 200 comprising an additional instance of the access transistor AT, an additional instance of the memory structure (M; 660 or 670) that is electrically connected to a source structure {(732, 742) or 52} of the additional instance of the access transistor AT, and at least one monitor transistor MT having a respective monitor gate electrode (754M or 15M) that is electrically connected to the source structure {(732, 742) or 52} of the additional instance of the access transistor AT.

In one embodiment, within the semiconductor circuit design, a monitor gate electrode (754M or 15M) of the at least one monitor transistor MT is electrically connected to the source structure {(732, 742) or 52} of the additional instance of the access transistor AT through at least one metal via structure (612 or 642) and at least one metal line (618 or 648).

In one embodiment, within the semiconductor circuit design, a monitor gate electrode (754M or 15M) of the at least one monitor transistor MT is in contact with the source structure {(732, 742) or 52} of the additional instance of the access transistor AT.

In one embodiment, within the semiconductor circuit design, each instance of the memory structure (M; 660 or 670) comprises a first electrode (662 or 672), a memory material layer 674 or a node dielectric layer 664, and a second electrode (666 or 676); and the first electrode (662 or 672) of the additional instance of the memory structure (M; 660 or 670) is electrically connected to the source structure {(732, 742) or 52} of the additional instance of the access transistor AT through a metal via structure (612 or 652).

In one embodiment, within the semiconductor circuit design, the at least one monitor transistor MT comprises a plurality of monitor transistors MT having different threshold voltages.

In one embodiment, within the semiconductor circuit design, each instance of the memory structure (M; 660 or 670) comprises a respective capacitor structure 660 including: a respective first electrode (662 or 672) that is electrically connected ( ) to the source structure {(732, 742) or 52} of a respective instance of the access transistor AT; a respective node dielectric layer 664 or a respective memory material portion 674; and a respective second electrode (666 or 676).

According to an aspect of the present disclosure, a method of forming a semiconductor device is provided. The method comprises: forming instances of an access transistor AT, an additional instance of the access transistor AT, and at least one monitor transistor MT having a respective monitor gate electrode (754M or 15M) over a substrate 8; and forming instances of a memory structure (M; 660 or 670) configured to store a data bit and an additional instance of the memory structure (M; 660 or 670), whereby an array 100 of memory cells 101 and a memory monitor device 200 are formed, and wherein: each of the memory cells 101 comprises a respective instance of the access transistor AT and a respective instance of the memory structure (M; 660 or 670) that is electrically connected to a source structure {(732, 742) or 52} of the respective instance of the access transistor AT; and the memory monitor device 200 comprises the additional instance of the access transistor AT, the additional instance of the memory structure (M; 660 or 670) that is electrically connected to a source structure {(732, 742) or 52} of the additional instance of the access transistor AT, and the at least one monitor transistor MT; and the respective monitor gate electrode (754M or 15M) is electrically connected to the source structure {(732, 742) or 52} of the additional instance of the access transistor AT.

In one embodiment, a method of forming a semiconductor device is provided. The method comprises forming an array 100 of memory cells 101 and a memory monitor device 200 over a substrate 8. Each of the memory cells 101 comprises a respective instance of an access transistor AT and a respective instance of a memory structure (M; 660 or 670) configured to store a data bit and electrically connected to a source structure {(732, 742) or 52} of the respective instance of the access transistor AT. The memory monitor device 200 comprises an additional instance of the access transistor AT, an additional instance of the memory structure (M; 660 or 670) that is electrically connected to a source structure {(732, 742) or 52} of the additional instance of the access transistor AT, and at least one monitor transistor MT having a respective monitor gate electrode (754M or 15M) that is electrically connected to the source structure {(732, 742) or 52} of the additional instance of the access transistor AT.

Embodiments of the present disclosure provide a new method for in-situ monitoring of storage node potential in memory cells. The method utilizes a monitor circuit that only uses transistors of one type (such as an n-type), eliminating the need for a complementary metal-oxide-semiconductor (CMOS) circuit. The test pattern size may be reduced compared to conventional methods, resulting in an area-efficient and cost-effective solution for monitoring storage node performance. Optionally, the memory monitor circuit of the present disclosure may use a plurality of monitor transistors with different threshold voltages to measure the amount of electrical charge in a capacitor or the resistivity of a resistive memory element. The storage node of a memory structure M may be connected to the monitor gate electrode(s) of at least one monitor transistor MT, allowing amplification of the changes in the electrical potential of the storage node to be amplified for easy in-situ monitoring during operation of the array 100 of memory cells 101.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
    an array of memory cells located over a substrate, wherein each of the memory cells comprises a respective instance of an access transistor and a respective instance of a memory structure configured to store a data bit and electrically connected to a source structure of the respective instance of the access transistor; and
    a memory monitor device comprising an additional instance of the access transistor, an additional instance of the memory structure that is electrically connected to a source structure of the additional instance of the access transistor, and at least one monitor transistor having a respective monitor gate electrode that is electrically connected to the source structure of the additional instance of the access transistor.

2. The semiconductor device of claim 1, wherein a monitor gate electrode of the at least one monitor transistor is electrically connected to the source structure of the additional instance of the access transistor through at least one metal via structure and at least one metal line.

3. The semiconductor device of claim 1, wherein a monitor gate electrode of the at least one monitor transistor is in contact with the source structure of the additional instance of the access transistor.

4. The semiconductor device of claim 1, wherein:
    each instance of the memory structure comprises a first electrode, a memory material layer or a node dielectric layer, and a second electrode; and
    the first electrode of the additional instance of the memory structure is electrically connected to the source structure of the additional instance of the access transistor through a metal via structure.

5. The semiconductor device of claim 1, wherein:
    the substrate comprises a semiconductor material layer; and
    each instance of the access transistor comprises a respective single crystalline semiconductor channel.

6. The semiconductor device of claim 1, wherein each instance of the access transistor comprises a respective polycrystalline semiconducting metal oxide channel.

7. The semiconductor device of claim 1, wherein the at least one monitor transistor comprises a plurality of monitor transistors having different threshold voltages.

8. The semiconductor device of claim 1, wherein each instance of the memory structure comprises a respective capacitor structure including:
    a respective first electrode that is electrically connected to the source structure of a respective instance of the access transistor;
    a respective node dielectric layer; and
    a respective second electrode.

9. The semiconductor device of claim 1, wherein each instance of the memory structure comprises:
    a respective first electrode that is electrically connected to the source structure of a respective instance of the access transistor;
    a memory material portion having at least two resistivity states exhibiting different electrical resistivities; and
    a respective second electrode.

10. A non-transitory machine-readable data storage medium that is encoded with a set of data representing a semiconductor circuit design, the set of data comprising:
    a first data representing an array of memory cells located over a substrate, wherein each of the memory cells comprises a respective instance of an access transistor and a respective instance of a memory structure configured to store a data bit and electrically connected to a source structure of the respective instance of the access transistor; and
    a second data representing a memory monitor device comprising an additional instance of the access transistor, an additional instance of the memory structure that is electrically connected to a source structure of the additional instance of the access transistor, and at least one monitor transistor having a respective monitor gate electrode that is electrically connected to the source structure of the additional instance of the access transistor.

11. The non-transitory machine-readable data storage medium of claim 10, wherein a monitor gate electrode of the at least one monitor transistor is electrically connected to the source structure of the additional instance of the access transistor through at least one metal via structure and at least one metal line.

12. The non-transitory machine-readable data storage medium of claim 10, wherein a monitor gate electrode of the at least one monitor transistor is in contact with the source structure of the additional instance of the access transistor.

13. The non-transitory machine-readable data storage medium of claim 10, wherein:
each instance of the memory structure comprises a first electrode, a memory material layer or a node dielectric layer, and a second electrode; and
the first electrode of the additional instance of the memory structure is electrically connected to the source structure of the additional instance of the access transistor through a metal via structure.

14. The non-transitory machine-readable data storage medium of claim 10, wherein the at least one monitor transistor comprises a plurality of monitor transistors having different threshold voltages.

15. The non-transitory machine-readable data storage medium of claim 10, wherein each instance of the memory structure comprises a respective capacitor structure including:
a respective first electrode that is electrically connected to the source structure of a respective instance of the access transistor;
a respective node dielectric layer; and
a respective second electrode.

16. A method of forming a semiconductor device, the method comprising:
forming instances of an access transistor over a substrate;
forming at least one monitor transistor having a respective monitor gate electrode;
forming instances of a memory structure configured to store a respective data bit therein; and
forming electrical connections to and from the instances of the access transistor, the at least one monitor transistor, and the instances of the memory structure, whereby an array of memory cells and a memory monitor device are formed, wherein:
each of the memory cells comprises a respective instance of the access transistor and a respective instance of the memory structure which is electrically connected to a source structure of the respective instance of the access transistor; and
the memory monitor device comprises an additional instance of the access transistor, an additional instance of the memory structure which is electrically connected to a source structure of the additional instance of the access transistor, and the at least one monitor transistor of which the respective monitor gate electrode is electrically connected to the source structure of the additional instance of the access transistor.

17. The method of claim 16, wherein a monitor gate electrode of the at least one monitor transistor is electrically connected to the source structure of the additional instance of the access transistor by forming at least one metal via structure and at least one metal line between the monitor gate electrode and the source structure.

18. The method of claim 16, wherein the source structure of the additional instance of the access transistor is formed directly on a monitor gate electrode of the at least one monitor transistor.

19. The method of claim 16, further comprising forming a metal via structure over the source structure of the additional instance of the access transistor, wherein:
each instance of the memory structure comprises a first electrode, a memory material layer or a node dielectric layer, and a second electrode; and
the first electrode of the additional instance of the memory structure is electrically connected to the source structure of the additional instance of the access transistor through the metal via structure.

20. The method of claim 16, further comprising depositing and patterning a polycrystalline semiconducting metal oxide layer, wherein each instance of the access transistor comprises a respective polycrystalline semiconducting metal oxide channel including a respective patterned portion of the polycrystalline semiconducting metal oxide layer.

* * * * *